(12) United States Patent
Sasamoto et al.

(10) Patent No.: US 11,914,608 B2
(45) Date of Patent: Feb. 27, 2024

(54) INFORMATION PROCESSING DEVICE, INFORMATION PROCESSING METHOD, AND STORAGE MEDIUM

(71) Applicant: FUJITSU LIMITED, Kawasaki (JP)

(72) Inventors: Yuki Sasamoto, Kawasaki (JP); Yusuke Komaba, Inagi (JP); Akihiro Inomata, Yokohama (JP); Naoki Matsuoka, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/680,879

(22) Filed: Feb. 25, 2022

(65) Prior Publication Data

US 2022/0342895 A1 Oct. 27, 2022

(30) Foreign Application Priority Data

Apr. 23, 2021 (JP) .................................. 2021-073624

(51) Int. Cl.
  *G06F 16/00* (2019.01)
  *G06F 16/25* (2019.01)
  *G06F 16/28* (2019.01)

(52) U.S. Cl.
  CPC .......... *G06F 16/254* (2019.01); *G06F 16/285* (2019.01)

(58) Field of Classification Search
  CPC .................................................. G06F 16/285
  USPC ........................................................ 707/738
  See application file for complete search history.

(56) References Cited

U.S. PATENT DOCUMENTS

| | | | | |
|---|---|---|---|---|
| 2014/0233719 | A1* | 8/2014 | Vymenets ............... | G06F 3/048 379/265.03 |
| 2020/0104375 | A1* | 4/2020 | Earnesty, Jr. ......... | G06F 16/214 707/707 |
| 2020/0104376 | A1* | 4/2020 | Earnesty, Jr. ......... | G06F 16/285 707/707 |
| 2020/0104377 | A1* | 4/2020 | Earnesty, Jr. ......... | G06F 9/4843 707/707 |
| 2020/0387526 | A1* | 12/2020 | Herron .................. | G06F 16/288 707/707 |

(Continued)

FOREIGN PATENT DOCUMENTS

| | | |
|---|---|---|
| JP | 2016-189079 A | 11/2016 |
| WO | 2007/090410 A1 | 8/2007 |
| WO | 2016/143037 A1 | 9/2016 |

OTHER PUBLICATIONS

Extended European Search Report dated May 3, 2022, issued in counterpart EP Application No. 22158849.4. (8 pages).

(Continued)

*Primary Examiner* — Alexandria Y Bromell
(74) *Attorney, Agent, or Firm* — WHDA, LLP

(57) ABSTRACT

An information processing device includes one or more memories; and one or more processors coupled to the one or more memories and the one or more processors configured to acquire allocation data that indicates an allocation result of a plurality of resources for a plurality of allocation destinations, extract data that violates a first condition from the acquired allocation data, classify the extracted data into a plurality of groups, acquire an index value regarding an appearance frequency of an allocation pattern of a resource of the plurality of resources based on data of each of the plurality of classified groups, and generate a second condition for the allocation pattern based on the index value.

11 Claims, 25 Drawing Sheets

(56) References Cited

U.S. PATENT DOCUMENTS

2020/0411170 A1* 12/2020 Brown .................. G06N 20/00
707/707
2021/0081904 A1 3/2021 Song

OTHER PUBLICATIONS

Bengio et al., "Machine learning for combinatorial optimization: A methodological tour d'horizon", European Journal of Operational Research, Mar. 20, 2020 (17 pages).

Zheng et al., "MLCP: A Framework Integrating with Machine Learning and Optimization for Planning and Scheduling in Manufacturing and Services", SoSE 2020, IEEE 15th International Conference of System of Systems Engineering, Jun. 2-4, 2020, Budapest, Hungary, pp. 000123-000128 (6 pages).

Pawlak et al., "Automatic synthesis of constraints from examples using mixed integer linear programming", European Journal of Operational Research, Feb. 24, 2017, pp. 1141-1157 (17 pages).

Kumar et al., "Automating Personnel Rostering by Learning Constraints Using Tensors", 2019 IEEE 31st International Conference on Tools with Artificial Intelligence (ICTAI), 2019, pp. 697-704 (8 pages).

* cited by examiner

| Cond. (1) | month 1 | | | | | | |
|---|---|---|---|---|---|---|---|
| | day 1 | | day 2 | | ... | day 31 | |
| | shift A | shift D | shift A | shift D | ... | shift A | shift D |
| agent 1 | 1 | | | | ... | | |
| agent 2 | | | 1 | | ... | 1 | |
| agent 3 | | | | 1 | ... | | |
| agent 4 | | 1 | | 1 | ... | | 1 |
| agent 5 | | 1 | | | ... | | 1 |

700-X

| Cond. (1) | month X | | | | | | |
|---|---|---|---|---|---|---|---|
| | day 1 | | day 2 | | ... | day 30 | |
| | shift A | shift D | shift A | shift D | ... | shift A | shift D |
| agent 1 | | | | | ... | 1 | |
| agent 2 | 1 | | 1 | | ... | | |
| agent 3 | | 1 | | 1 | ... | | 1 |
| agent 4 | | | | | ... | | |
| agent 5 | | 1 | | 1 | ... | | 1 |

FIG. 13

| EXTRACTED CONSTRAINT CONDITION | | | | |
|---|---|---|---|---|
| Team I | MR. Agent 1 | Shift A (22:00-06:00) | PREFERENCE | |
| Team II | MR. Agent 10 | Shift B (06:00-17:00) | PREFERENCE | |
| Team III | MR. Agent 2<br>MR. Agent 4 | Shift E (09:00-14:00) | PREFERENCE | |
| ... | ... | ... | ... | |

| CONDITION ID | DATA ID | SATISFACTION RATE |
|---|---|---|
| Cx | D1-1 | 1.0 |
| Cx | D2-1 | 0.6 |
| Cx | D3-1 | 0.0 |
| ... | ... | ... |

FIG. 20

SCHEDULE OF Team I

| | 2020/04/01 | 2020/04/02 | 2020/04/03 | ... |
|---|---|---|---|---|
| MR. Agent 1 | 22:00-06:00 | 22:00-06:00 | 09:00-17:00 | ... |
| MR. Agent 2 | 06:00-14:00 | off | 06:00-14:00 | ... |
| MR. Agent 3 | off | 09:00-17:00 | 09:00-17:00 | ... |
| MR. Agent 4 | 09:00-17:00 | 06:00-14:00 | 06:00-14:00 | ... |
| MR. Agent 5 | 09:00-17:00 | 09:00-17:00 | 22:00-06:00 | ... |

▨ :CONSTRAINT VIOLATING PORTION

MACHINE ALLOCATION DATA — 2101

| Machine | month 1 | | | | | | | | |
| --- | --- | --- | --- | --- | --- | --- | --- | --- | --- |
| | day 1 | | | | day 2 | | | | ... |
| | shift A | shift B | shift C | shift D | shift A | shift B | shift C | shift D | ... |
| agent 1 | 1 | | | | | | | | ... |
| agent 2 | | | 1 | | | 1 | | | ... |
| agent 3 | | | | | | | | 1 | ... |
| agent 4 | | 1 | | | | | | 1 | ... |
| agent 5 | | | | 1 | | | 1 | | ... |

⇔ COMPARISON

SATISFACTION DETERMINATION — 2103
(1 = VIOLATING PORTION)

| | month 1 | | | | | | | | |
| --- | --- | --- | --- | --- | --- | --- | --- | --- | --- |
| | day 1 | | | | day 2 | | | | ... |
| | shift A | shift B | shift C | shift D | shift A | shift B | shift C | shift D | ... |
| agent 1 | 0 | 0 | 0 | 0 | 0 | 0 | 0 | 0 | ... |
| agent 2 | 0 | 0 | 0 | 0 | 0 | 0 | 0 | 0 | ... |
| agent 3 | 0 | 0 | 0 | 0 | 0 | 0 | 0 | 0 | ... |
| agent 4 | 0 | 0 | 0 | 0 | 0 | 0 | 0 | 0 | ... |
| agent 5 | 0 | 0 | 0 | 0 | 0 | 0 | 0 | 0 | ... |

⇔ 比較

CORRECTION ALLOCATION DATA — 2102

| Human | month 1 | | | | | | | | |
| --- | --- | --- | --- | --- | --- | --- | --- | --- | --- |
| | day 1 | | | | day 2 | | | | ... |
| | shift A | shift B | shift C | shift D | shift A | shift B | shift C | shift D | ... |
| agent 1 | 1 | | | | | | | | ... |
| agent 2 | | 1 | | | | 1 | | | ... |
| agent 3 | | | 1 | | | | | 1 | ... |
| agent 4 | | | | 1 | | 1 | | | ... |
| agent 5 | | | | 1 | | | | 1 | ... |

— 2104

| | month 1 | | | | | | | | |
| --- | --- | --- | --- | --- | --- | --- | --- | --- | --- |
| | day 1 | | | | day 2 | | | | ... |
| | shift A | shift B | shift C | shift D | shift A | shift B | shift C | shift D | ... |
| agent 1 | 1 | 0 | 0 | 0 | 0 | 0 | 0 | 0 | ... |
| agent 2 | 1 | 0 | 0 | 1 | 0 | 0 | 0 | 0 | ... |
| agent 3 | 1 | 0 | 0 | 1 | 0 | 0 | 0 | 0 | ... |
| agent 4 | 1 | 0 | 0 | 1 | 0 | 0 | 0 | 0 | ... |
| agent 5 | 1 | 0 | 0 | 1 | 0 | 0 | 0 | 0 | ... |

INFORMATION PROCESSING DEVICE, INFORMATION PROCESSING METHOD, AND STORAGE MEDIUM

CROSS-REFERENCE TO RELATED APPLICATION

This application is based upon and claims the benefit of priority of the prior Japanese Patent Application No. 2021-73624, filed on Apr. 23, 2021, the entire contents of which are incorporated herein by reference.

FIELD

The embodiments discussed herein are related to an information processing device, an information processing method, and a storage medium.

BACKGROUND

In recent years, with the rapid development of digital technology, digital transformation (DX), which uses new technology to change existing businesses and operations, has been attracting attention. For the implementation of DX, various types of information in the existing operations are collected as data, and improvement of the existing operations and improvement of efficiency using the data are expected. For example, resources such as persons and things are allocated using past data.

As an existing technology, a plurality of provisional plans is created applying a constraint condition known for a predetermined event and each use information to a predetermined algorithm, among sets of each provisional plan and a created plan corresponding to the provisional plan, a created plan and its use information in a dissimilar set in which a similarity between the plans is equal or less than a predetermined criterion are applied to the predetermined algorithm, and a new constraint condition corresponding to a factor of the dissimilarity between the plans is generated.

Japanese Laid-open Patent Publication No. 2016-189079 is disclosed as related art.

SUMMARY

According to an aspect of the embodiments, an information processing device includes one or more memories; and one or more processors coupled to the one or more memories and the one or more processors configured to acquire allocation data that indicates an allocation result of a plurality of resources for a plurality of allocation destinations, extract data that violates a first condition from the acquired allocation data, classify the extracted data into a plurality of groups, acquire an index value regarding an appearance frequency of an allocation pattern of a resource of the plurality of resources based on data of each of the plurality of classified groups, and generate a second condition for the allocation pattern based on the index value.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is an explanatory diagram illustrating a specific example of conflict set data;

FIG. 13 is an explanatory diagram illustrating a screen example of a constraint condition display screen;

FIG. 16 is an explanatory diagram illustrating an example of stored content in a DB with constraint conditions 1600;

FIG. 20 is an explanatory diagram illustrating a screen example of a determination result screen;

FIG. 21A is an explanatory diagram (part 1) illustrating an operation example of an allocation support server 201 according to a third embodiment;

DESCRIPTION OF EMBODIMENTS

With the existing technology, it is difficult to extract the constraint condition to be applied only to a specific individual or team when allocating resources such as persons and things.

In one aspect, the present embodiments aim to extract a condition to be used for resource allocation.

According to one aspect of the present embodiments, there is an effect of extracting a condition to be used for resource allocation.

Hereinafter, embodiments of an information processing device, an information processing method, and an information processing program will be described in detail with reference to the drawings.

First Embodiment

Figure 1:
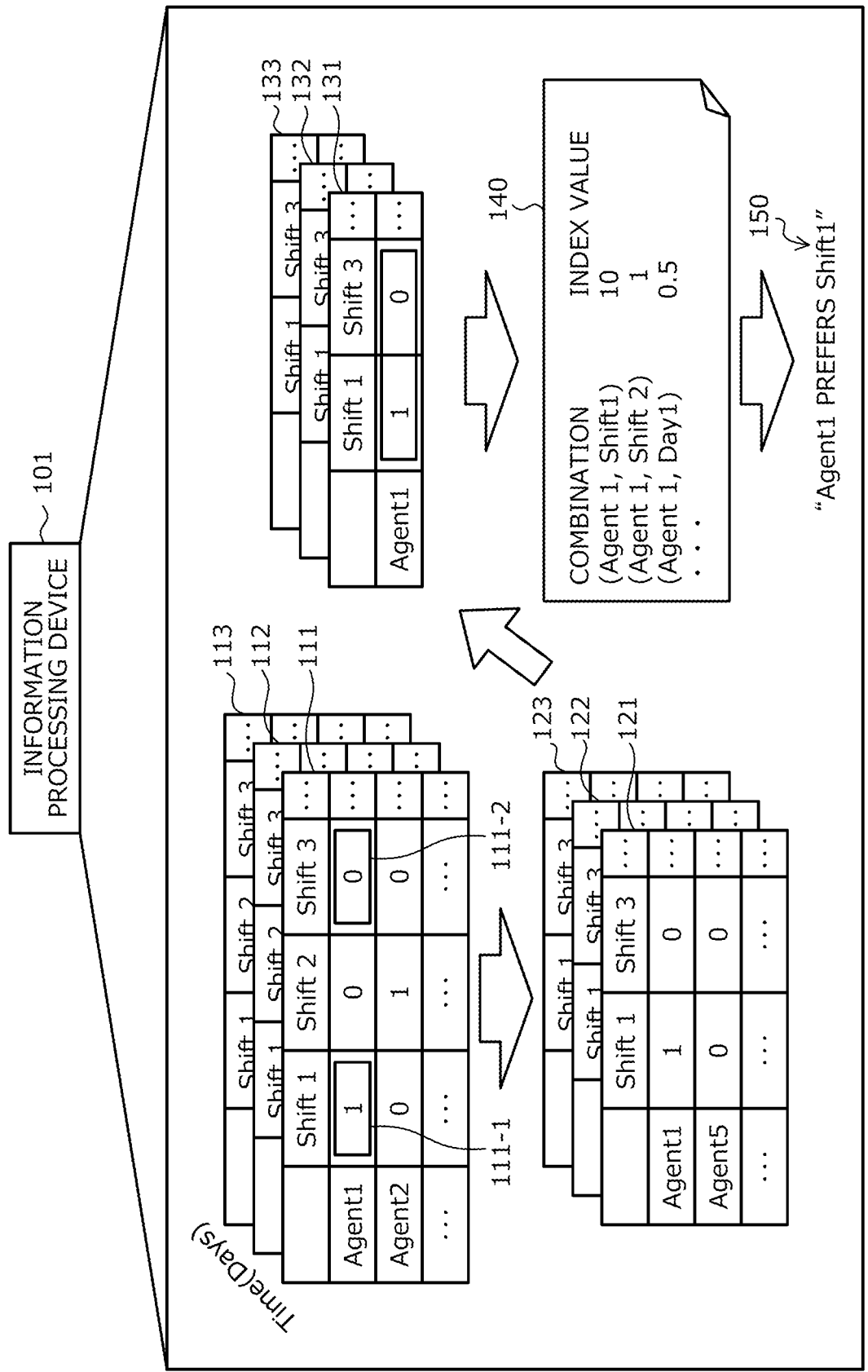
FIG. 1 is an explanatory diagram illustrating one example of an information processing method according to a first embodiment.

FIG. 1 is an explanatory diagram illustrating one example of an information processing method according to a first embodiment. In FIG. 1, an information processing device 101 is a computer that extracts a condition to be used for resource allocation. Resources are, for example, people (agents) and things (rooms, equipment, and the like). The resource allocation is to allocate the resources to allocation destinations. The allocation destinations are, for example, shifts (working timetable), work, place, time, and the like. The condition is, for example, a constraint condition used to optimize the resource allocation.

Here, with the development of computers and optimization algorithms, it has become possible to automatically perform the resource allocation, which was conventionally completely manually performed. However, it may be difficult to formulate the constraint condition to be considered for the resource allocation as an optimization problem in advance. To cope with that, there is a technology for improving the efficiency of the resource allocation by utilizing past data by machine learning or the like.

For example, machine learning constraint programming (MLCP) is a technology for extracting experience knowhow from past data. In this existing technology, for example, boundary conditions and distribution of determinants are extracted from past data as patterns with respect to the constraint condition interviewed in advance.

Furthermore, there is an existing technology for extracting a weight of a constraint condition from past data. In this existing technology, for example, from feasible data and infeasible data determined on the basis of a known constraint condition, the constraint condition applied to the data and the weight of the constraint condition are extracted.

Furthermore, there is an existing technology for extracting a strict constraint condition from past data. In this existing technology, for example, past allocation data is treated as a tensor, and a variable combination (condition) and its count number (boundary value) are calculated to extract the strict constraint condition related to rules and contracts.

These existing technologies are for extracting a known or explicit constraint condition related to regulations, contracts, or the like and its range (such as a distribution according to the boundary value and the determinant) on the basis of past data. However, in actual resource allocation, there is a potential constraint condition based on preferences of a team and individuals to which the resources are allocated.

In performing the resource allocation, if the potential constraint condition is omitted, sufficient allocation by machines is not able to be performed, which leads to a burden on a person in charge of allocation, such as manual confirmation and correction. Furthermore, there are no clear rules or indexes such as regulations for the potential constraint condition, and the potential constraint condition is often set on the basis of an experience and awareness of the person in charge of allocation, and it is difficult to grasp all matters in advance by an interview or the like.

Therefore, in the present embodiment, an information processing method for automatically extracting a condition to be used for resource allocation, such as a potential constraint condition set on the basis of preferences of a specific individual or team, will be described. Here, a processing example of the information processing device 101 will be described.

(1) The information processing device 101 acquires allocation data indicating allocation results of a plurality of resources to a plurality of allocation destinations. Here, the allocation data is allocation data created in the past, and is information indicating which resource was allocated to which allocation destination. For example, the allocation data is allocation data obtained by manually modifying (by the person in charge of allocation) allocation data automatically created by a machine (computer). Furthermore, the allocation data may also be allocation data automatically created by the machine.

In the example of FIG. 1, a case where past allocation data 111 to 113 are acquired is assumed. For example, when the resource is "agent" and the allocation destination is "shift", each of the allocation data 111 to 113 is the allocation result for each day when a plurality of agents is allocated to a plurality of shifts.

(2) The information processing device 101 extracts data that violates a first condition from the acquired allocation data. Here, the first condition can be arbitrarily set, and is, for example, a condition relating to fairness that is uniformly applied to the plurality of resources. More specifically, for example, the first condition corresponds to an explicit constraint condition. The explicit constraint condition is, for example, a condition that is set on the basis of regulations, contracts, and known rules and indexes for an industry or the entire team.

Specific examples of the explicit constraint condition include "be sure every employee has total weekly work hours of X hours or less", "be sure the number of people for normal work on weekdays or weekends is X or more", "every employee works at least once on weekends", "every employee works at least once at midnight (or early morning)", "shifts are evenly allocated to all employees", and the like.

In the example of FIG. 1, portions violating the first condition (for example, data 111-1 and 111-2) are extracted from the allocation data 111 to 113, and conflict sets 121 to 123 that are sets of data violating the first condition are respectively created.

(3) The information processing device 101 classifies the extracted data into a plurality of groups according to a predetermined criterion. Here, the predetermined criterion can be arbitrarily set, and is, for example, a criterion for classifying the data by resource (agent, room, equipment, or the like) or by set of one or a plurality of resources (team, or the like).

In the example of FIG. 1, it is assumed that the conflict sets 121 to 123 are classified by resource (agent) and the conflict set for each resource (for example, each of conflict sets 131 to 133) is created.

(4) The information processing device 101 calculates an index value regarding an appearance frequency of an allocation pattern of resources included in the plurality of resources on the basis of the data of each of the plurality of classified groups. Here, the allocation pattern of resources is a pattern indicating to which allocation destination a resource (one or a plurality of resources) allocated.

The allocation pattern of resources is specified from, for example, the data of each of the plurality of classified groups, and is represented by a combination of variables indicating the resources and the allocation destinations. The index value regarding the appearance frequency indicates, for example, how often the allocation pattern of resources appears in each group as compared with a group other than the group.

Specifically, for example, the information processing device 101 may also calculate a relative frequency value for each allocation pattern of resources on the basis of the data of each of the plurality of groups. As the relative frequency value, for example, a lift value, a degree of support, a degree of certainty, or the like used in general association analysis or the like can be used.

In the example of FIG. 1, it is assumed that the relative frequency value for each allocation pattern of resources is calculated using the conflict set for each resource (for example, the conflict sets 131 to 133). A relative frequency table 140 illustrates the index value (relative frequency value) for each allocation pattern of resources (each combination of a variable indicating the resource and a variable indicating the allocation destination).

(5) The information processing device 101 generates a second condition for the allocation pattern of resources on the basis of the calculated index value. Here, the second condition is a condition in a conflicting relationship with the first condition, which is applied to some resources of the plurality of resources. The condition in a conflicting relationship with the first condition is a condition that does not satisfy the first condition. More specifically, for example, the second condition corresponds to a potential constraint condition.

The potential constraint condition is, for example, a condition set on the basis of preferences of a specific team or individual. Specific examples of the potential constraint condition include "some employees never work on weekends (because of inexperienced skills)", "apply only specific shift work to some employees (because of new employees)", "apply midnight shift work (or early morning shift work) to some employees (preference)", "apply regular work to some employees (preference)", "apply same shift work to some employees A and B (for education)", "apply specific shift work to some employees C and D (because of a required skill set)", and the like.

Here, the preferences of a team or individual (potential constraint condition) tend to "conflict with the constraint condition commonly (fairly) imposed to the team/individuals" (relevancy between constraint conditions). For example, "some employees never work on weekends (because of inexperienced skills)" conflicts with "every employee works at least once on weekends". Furthermore, "apply only specific shift work to some employees (because of new employees)" conflicts with "shifts are evenly allocated to all employees".

Furthermore, the preferences of a team or individual (potential constraint condition) tend to occur frequently within a particular team/individual" (relevancy between targets to be allocated). For example, "apply specific shift work to some employees C and D (because of a required skill set)" is applied only to team (i) in which the skill set is complexly set. Furthermore, "apply only specific shift work to some employees (because of new employees)" is applied only to Mr. A, who is a new employee in team (ii).

Therefore, for example, the information processing device 101 detects the allocation pattern frequently occurring in an individual or a team on the basis of the index value calculated from the data (data violating the first condition) classified by individual or team, and generates the condition (second condition) for the allocation pattern.

Specifically, for example, the information processing device 101 specifies a resource allocation pattern having the calculated index value equal to or larger than a threshold value. Then, the information processing device 101 generates the second condition for the specified resource allocation pattern.

In the example of FIG. 1, it is assumed that the combination of (Agent1, Shift1) is specified as the resource allocation pattern having the index value (relative frequency value) equal to or larger than the threshold value. In this case, for the combination of (Agent1, Shift1), for example, a second condition 150 that "Agent1 prefers Shift1" is generated.

In this way, according to the information processing device 101, the potential constraint condition set on the basis of preferences of a specific individual or team can be extracted. Thereby, the constraint condition for optimizing the resource allocation can be automatically extracted without conducting a careful interview or the like in advance by the person in charge of allocation.

In the example of FIG. 1, the constraint condition of "Agent1 prefers Shift1", which is applied only to Agent1, can be extracted.

(System Configuration Example of Information Processing System 200)

Next, a system configuration example of an information processing system 200 including the information processing device 101 illustrated in FIG. 1 will be described. In the following description, a case where the information processing device 101 illustrated in FIG. 1 is applied to an allocation support server 201 in the information processing system 200 will be described as an example.

The information processing system 200 is applied to, for example, a system that provides a person or thing allocation support service in a facility such as a call center or a hospital. More specifically, for example, the information processing system 200 can be applied to services that support agent scheduling, nurse scheduling, operating room scheduling, bed scheduling, and the like.

Figure 2:
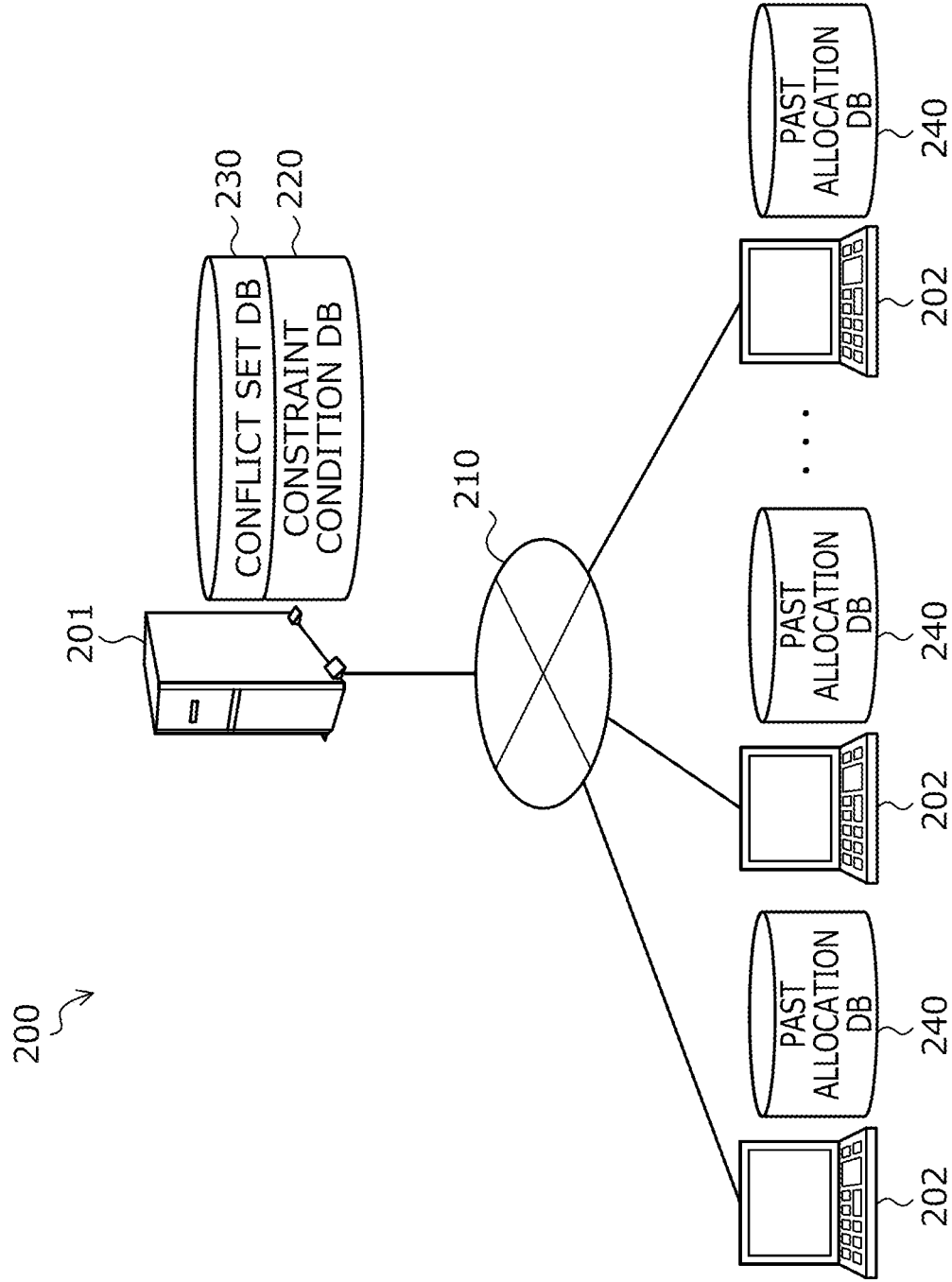
FIG. 2 is an explanatory diagram illustrating a system configuration example of an information processing system 200.

FIG. 2 is an explanatory diagram illustrating a system configuration example of the information processing system 200. In FIG. 2, the information processing system 200 includes the allocation support server 201 and a plurality of client devices 202. In the information processing system 200, the allocation support server 201 and the client device 202 are connected via a wired or wireless network 210. The network 210 is, for example, the Internet, a local area network (LAN), a wide area network (WAN), or the like.

The allocation support server 201 is a computer that has a constraint condition database (DB) 220 and a conflict set DB 230, and supports the resource allocation. Stored content in the constraint condition DB 220 and the conflict set DB 230 will be described below with reference to FIGS. 5 and 6.

The client device 202 is a computer used by a user of the information processing system 200. The user is, for example, a person in charge of performing allocation operation (person in charge of allocation). The client device 202 has a past allocation DB 240. The past allocation DB 240 stores the allocation data created in the past. Examples of the client device 202 include a personal computer (PC), a tablet PC, and the like. A specific example of the allocation data stored in the past allocation DB 240 will be described below with reference to FIG. 4.

Note that here the allocation support server 201 and the client device 202 are separately provided but the configuration is not limited thereto. For example, the allocation support server 201 may also be implemented by the client device 202.

(Hardware Configuration Example of Allocation Support Server 201)

Figure 3:
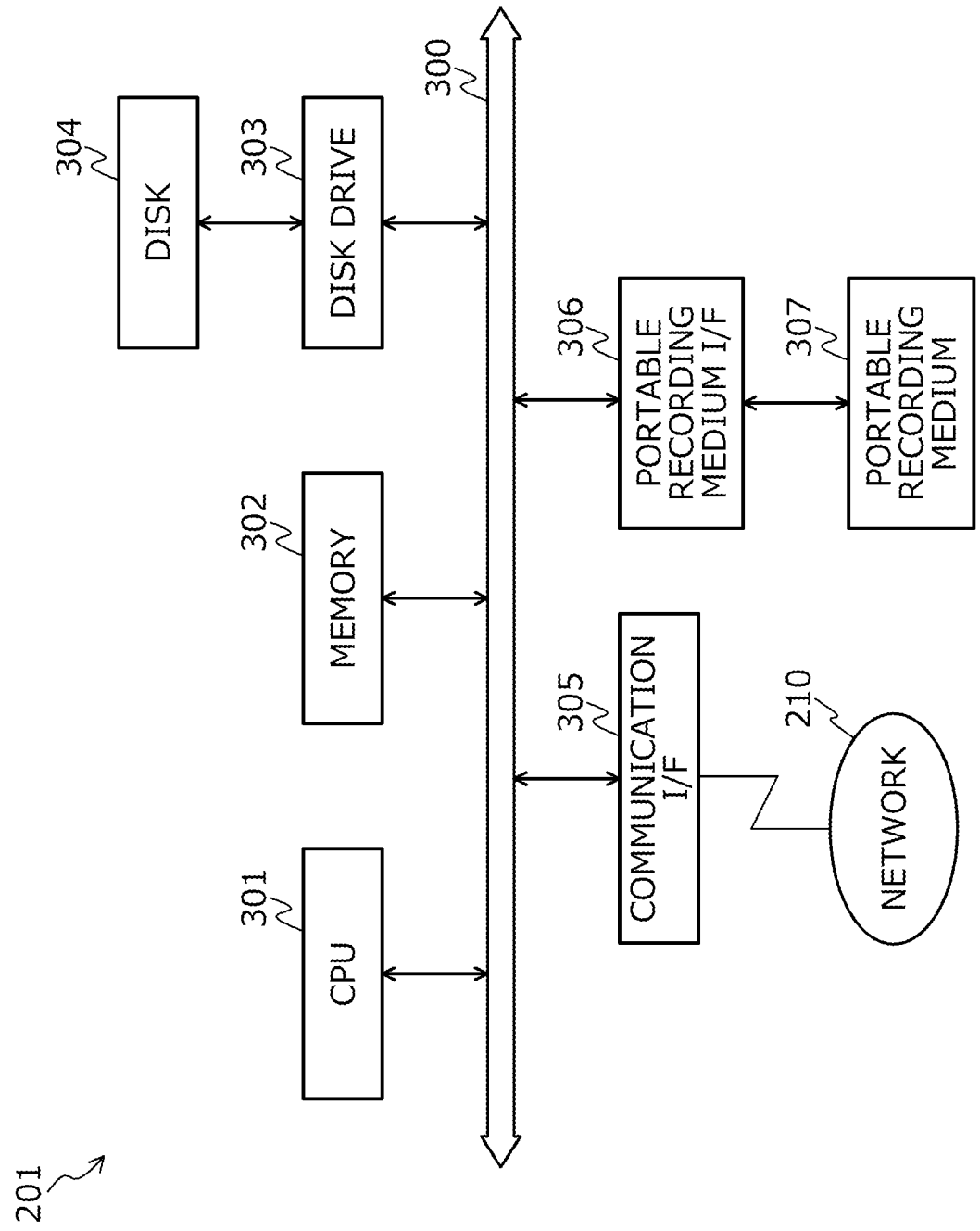
FIG. 3 is a block diagram illustrating a hardware configuration example of an allocation support server 201.

FIG. 3 is a block diagram illustrating a hardware configuration example of the allocation support server 201. In FIG. 3, the allocation support server 201 includes a central processing unit (CPU) 301, a memory 302, a disk drive 303, a disk 304, a communication interface (I/F) 305, a portable recording medium I/F 306, and a portable recording medium 307. Furthermore, the components are connected to each other by a bus 300.

Here, the CPU 301 is in charge of overall control of the allocation support server 201. The CPU 301 may also include a plurality of cores. The memory 302 includes, for example, a read only memory (ROM), a random access memory (RAM), a flash ROM, and the like. Specifically, for example, the flash ROM stores an operating system (OS) program, the ROM stores application programs, and the RAM is used as a work area for the CPU 301. The programs stored in the memory 302 are loaded into the CPU 301 to cause the CPU 301 to execute coded processing.

The disk drive 303 controls read/write of data from/to the disk 304 under the control of the CPU 301. The disk 304 stores data written under the control of the disk drive 303. Examples of the disk 304 include a magnetic disk, an optical disk, and the like.

The communication I/F 305 is connected to the network 210 through a communication line, and is connected to an external computer (for example, client device 202 illustrated in FIG. 2) via the network 210. Then, the communication I/F 305 manages an interface between the network 210 and the inside of the device, and controls input and output of data from an external computer. For example, a modem, a LAN adapter, or the like may be employed as the communication I/F 305.

The portable recording medium I/F 306 controls read/write of data from/to the portable recording medium 307 under the control of the CPU 301. The portable recording medium 307 stores data written under the control of the portable recording medium I/F 306. Examples of the portable recording medium 307 include a compact disc (CD)-ROM, a digital versatile disk (DVD), a universal serial bus (USB) memory, and the like.

Note that the allocation support server 201 may also include, for example, an input device, a display, and the like, in addition to the components described above. Furthermore, the client device 202 illustrated in FIG. 2 may be implemented by a hardware configuration similar to that of the allocation support server 201. However, the client device 202 includes, for example, an input device, a display, and the like in addition to the components described above.

(Specific Example of Allocation Data)

Next, a specific example of the allocation data stored in the past allocation DB 240 of the client device 202 will be described with reference to FIG. 4.

Figure 4:
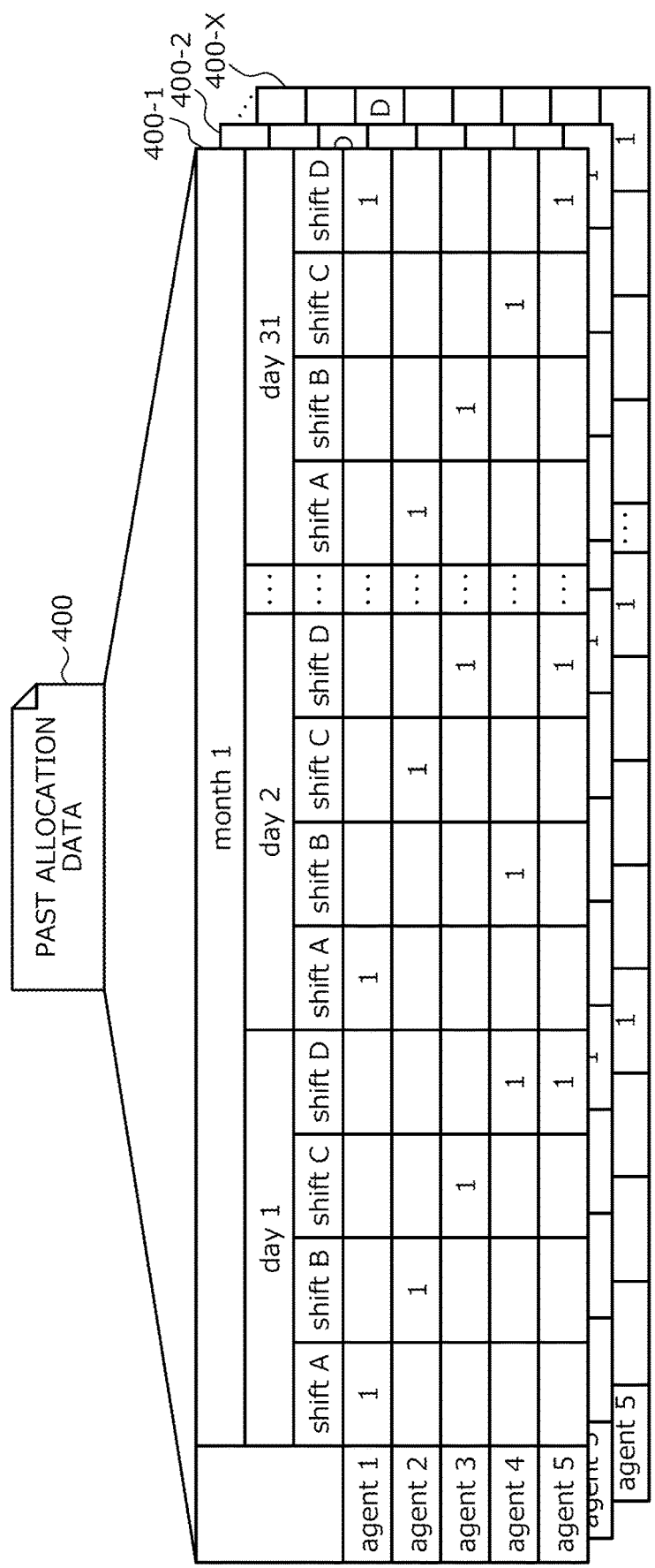
FIG. 4 is an explanatory diagram illustrating a specific example of allocation data.

FIG. 4 is an explanatory diagram illustrating a specific example of allocation data. In FIG. 4, past allocation data 400 is an example of the allocation data created in the past, and includes allocation data 400-1 to 400-X for past X months. Each of the allocation data 400-1 to 400-X corresponds to shift data for each month, and is information indicating which agent (resource) is allocated to which shift (allocation destination) on a daily basis.

(Stored Content in Constraint Condition DB 220)

Next, stored content in the constraint condition DB 220 of the allocation support server 201 will be described with reference to FIG. 5. Note that the constraint condition DB 220 and the conflict set DB 230 are implemented by, for example, a storage device such as the memory 302 or the disk 304 illustrated in FIG. 3.

Figure 5:
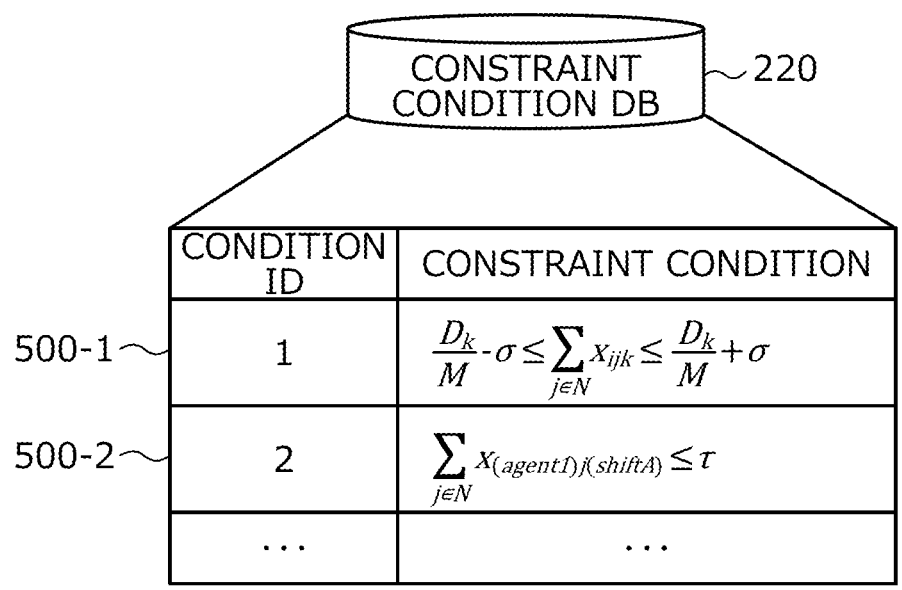
FIG. 5 is an explanatory diagram illustrating an example of stored content in a constraint condition DB 220.

FIG. 5 is an explanatory diagram illustrating an example of stored content in the constraint condition DB 220. In FIG. 5, the constraint condition DB 220 has fields of condition ID and constraint condition, and stores constraint condition information (for example, constraint condition information 500-1 and 500-2) as a record by setting information in the fields.

Here, the condition ID is an identifier that uniquely identifies the constraint condition. The constraint condition indicates a condition to be used for resource allocation. As the constraint condition, for example, an explicit constraint condition set on the basis of regulations, contracts, and known rules and indexes for an industry or the entire team is stored. Furthermore, as the constraint condition, a condition (potential constraint condition) generated by the allocation support server 201 may also be stored.

(Functional Configuration Example of Allocation Support Server 201)

Next, a functional configuration example of the allocation support server 201 according to the first embodiment will be described with reference to FIG. 6.

Figure 6:
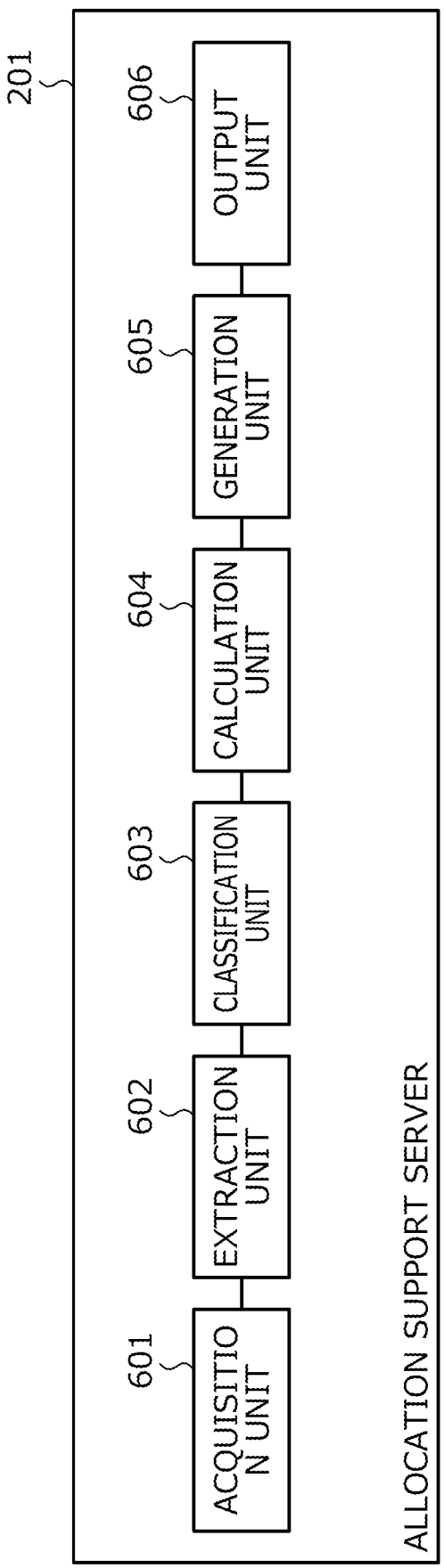
FIG. 6 is a block diagram illustrating a functional configuration example of the allocation support server 201 according to the first embodiment.

FIG. 6 is a block diagram illustrating a functional configuration example of the allocation support server 201 according to the first embodiment. In FIG. 6, the allocation support server 201 includes an acquisition unit 601, an extraction unit 602, a classification unit 603, a calculation unit 604, a generation unit 605, and an output unit 606. The acquisition unit 601 to output unit 606 have functions serving as a control unit, and specifically, for example, those functions are implemented by the program stored in a storage device such as the memory 302, disk 304, or portable recording medium 307 illustrated in FIG. 3 executed by the CPU 301 or by the communication LT 305. A processing result of each functional unit is stored in, for example, a storage device such as the memory 302 or the disk 304.

The acquisition unit 601 acquires allocation data indicating allocation results of a plurality of resources to a plurality of allocation destinations. The acquired allocation data is, for example, the past allocation data 400 as illustrated in FIG. 4. The past allocation data 400 includes the allocation data 400-1 to 400-X for each month for past X months.

Specifically, for example, the acquisition unit 601 acquires the received past allocation data 400 by receiving the past allocation data 400 from the client device 202 illustrated in FIG. 2. Furthermore, the acquisition unit 601 may also acquire allocation data input by a user's operation using an input device (not illustrated).

The extraction unit 602 extracts data that violates the first condition from the acquired allocation data. Specifically, for example, first, the extraction unit 602 acquires a known constraint condition as the first condition from the constraint condition DB 220 illustrated in FIG. 5. At this time, the extraction unit 602 may also acquire the constraint condition relating to fairness, which is uniformly applied to a plurality of resources, as the first condition.

In the following description, the first condition may be referred to as an "explicit constraint condition".

Next, the extraction unit 602 determines satisfaction of the acquired explicit constraint condition for the acquired past allocation data 400. Satisfaction of the explicit constraint condition may also be determined using, for example, an existing constraint satisfaction solver. Then, the extraction unit 602 extracts the data that violates the explicit constraint condition by extracting data of a portion where the explicit constraint condition is not satisfied from the past allocation data 400.

Note that the extraction unit 602 may also calculate a satisfaction rate of the explicit constraint condition for each data section obtained by dividing the acquired allocation data, and extract a data section having the calculated satisfaction rate equal to or less than a fixed value as the data that violates the explicit constraint condition.

In the following description, a set of data that violates the extracted explicit constraint condition may be referred to as "conflict set data". Note that a specific example of the conflict set data will be described below with reference to FIG. 7.

The classification unit 603 classifies the extracted conflict set data into a plurality of groups according to a predetermined criterion. Specifically, for example, the classification unit 603 may also classify the extracted conflict set data into a plurality of groups by grouping the data by resource (agent, or the like). Furthermore, the classification unit 603 may also classify the extracted conflict set data into a plurality of groups by collecting the data for each team. A team contains one or more resources (persons to be allocated).

Furthermore, the classification unit 603 may also classify the extracted conflict set data into a plurality of groups by collecting the data for each allocation destination (shift or the like). Furthermore, the classification unit 603 may also classify the extracted conflict set data into a plurality of groups, using a general classifier for tensor data and matrix data.

The calculation unit 604 calculates the index value regarding the appearance frequency of the allocation pattern of resources included in the plurality of resources on the basis of the data (conflict set data) of each of the plurality of classified groups. The allocation pattern of resources is a pattern indicating to which allocation destination a resource is allocated, and is represented by a combination of variables of the resource and the allocation destination, for example.

Specifically, for example, the calculation unit 604 calculates the relative frequency value for each allocation pattern of resources on the basis of the conflict set data of each of the plurality of groups. As the relative frequency value, for example, a lift value, a degree of support, a degree of certainty, or the like can be used. Note that an example of calculating the relative frequency value for each allocation pattern of resources will be described below with reference to FIG. 8.

The generation unit 605 generates the second condition for the resource allocation pattern on the basis of the calculated index value. The second condition is a condition in a conflicting relationship with the first condition, which is applied to some resources of the plurality of resources.

Specifically, for example, the generation unit 605 specifies the allocation pattern of resources having the calculated relative frequency value equal to or larger than a threshold value $\alpha$. The threshold value $\alpha$ can be arbitrarily set, and is set to, for example, "1". Then, the generation unit 605 generates the second condition for the specified allocation pattern of resources on the basis of the acquired allocation data.

More specifically, for example, the generation unit 605 may also generate the second condition that includes a boundary value. The boundary value is, for example, a boundary value related to a combination of variables indicating an allocation pattern, and is calculated on the basis of data of each predetermined period (such as one month) among the acquired past allocation data. Specifically, for example, the boundary value may also be calculated on the basis of the number of times of each predetermined period in which the variables of the combination co-occur at the same time.

Note that the generation unit 605 may also specify the allocation pattern of resources having the highest calculated relative frequency value. Furthermore, the generation unit 605 may also specify the allocation patterns of some of top resources having a high calculated relative frequency value. Furthermore, the generation unit 605 may also specify the allocation patterns of resources having the calculated relative frequency value less than a threshold value $\beta$ or within a predetermined range.

In the following description, the second condition may be referred to as a "potential constraint condition". Note that an example of generating the potential constraint condition will be described below with reference to FIGS. 7 and 8.

The output unit 606 outputs the generated potential constraint condition. Examples of an output method by the output unit 606 include storing the calculation result in a storage device such as the memory 302 or the disk 304, transmitting the calculation result to another computer (for example, to the client device 202) by the communication I/F 305, displaying the calculation result on a display (not illustrated), and the like.

Specifically, for example, the output unit 606 may also assign a condition ID to the generated potential constraint condition and store the generated potential constraint condition in the constraint condition DB 220 as illustrated in FIG. 5. At this time, the output unit 606 may store the generated potential constraint condition in a distinguishable manner from the known constraint condition (explicit constraint condition).

Here, the constraint condition to be considered in performing the resource allocation may change over time due to an influence of a period (for example, a season of a busy period, the end of a new employee period, or the like).

Therefore, for example, the classification unit 603 may also classify the extracted conflict set data into a plurality of groups according to a predetermined criterion for each predetermined period. The predetermined period can be arbitrarily set, and is set to, for example, one year, a quarter, or the like. That is, the classification unit 603 may also classify the conflict set data on the basis of the periodicity criterion (for each year or for each quarter).

Furthermore, there may be a case where the potential constraint condition is not generated depending on the explicit constraint condition used to extract the violating data. On the other hand, similar potential constraint conditions tend to be generated if resources to be allocated are similar.

Therefore, for example, in a case where new allocation data is acquired after the potential constraint condition is generated on the basis of certain allocation data, the extraction unit 602 may also determine whether the resources to be allocated are similar between the certain allocation data and the new allocation data. The similarity of the resources to be allocated is determined on the basis of, for example, the person in charge of allocation, attributes and the number of resources to be allocated, operations implemented by the allocation, and the like.

For example, the extraction unit 602 may also determine that the resources to be allocated are similar when the persons in charge of allocation are the same. Furthermore, the extraction unit 602 may also determine that the resources to be allocated are similar when the attributes or the numbers of resources to be allocated are the same. Furthermore, the extraction unit 602 may also determine that the resources to be allocated are similar when the operations to be implemented by the allocation are the same.

Here, in the case where the resources to be allocated are similar, the extraction unit 602 may also, using the same explicit constraint condition as the certain allocation data, extract the data violating the corresponding explicit constraint condition from the new allocation data. On the other hand, in the case where the resources to be allocated are not similar, the extraction unit 602 may also, using the explicit constraint condition different from the certain allocation data, extract the data violating the corresponding explicit constraint condition from the new allocation data.

More specifically, for example, the extraction unit 602 also uses the explicit constraint condition used to extract the potential constraint condition in team A, for the explicit constraint condition in similar team B. Thereby, the potential constraint condition in team B similar to team A can be efficiently generated using the explicit constraint condition that has been actually used to generate the potential constraint condition in team A.

Note that the above-described functional units (acquisition unit 601 to output unit 606) of the allocation support server 201 may also be implemented by, for example, a plurality of computers (for example, the allocation support server 201 and the client device 202) operating in cooperation with each other.

(Example of Generating Potential Constraint Condition)

Next, an example of generating the potential constraint condition will be described below with reference to FIGS. 7 and 8.

Here, an example of generating the potential constraint condition will be described by applying the example to the agent scheduling of a certain team. Furthermore, description will be given using an example in which the number of agents is "5", the number of shift patterns is "4", and the past allocation data is the past allocation data 400 illustrated in FIG. 4.

First, the extraction unit 602 acquires a known constraint condition from the constraint condition DB 220, as the explicit constraint condition. Here, a case in which the constraint condition described in the following equation (1) is acquired as the explicit constraint condition is assumed. The following equation (1) is the constraint condition for allocating shifts evenly to all the employees, and is an example of the constraint condition related to fairness that is uniformly applied to a plurality of resources (agents). The following equation (1) corresponds to the constraint condition of the condition ID "1" in the constraint condition DB 220.

[Math. 1]

$$\frac{D_k}{M} - \sigma \leq \sum_{j \in N} x_{ijk} \leq \frac{D_k}{M} + \sigma \quad (1)$$

Note that i represents a subscript of the agent. j represents a subscript of day. k represents a subscript of shift. $x_{ijk}$ is "1" when day j of agent i is shift k, and is "0" in other cases. $D_k$ represents the required number of shift k. M represents the number of agents. N represents the target number of days. $\sigma$ represents a variation tolerance offset of uniformity.

For example, the extraction unit 602 determines whether the above-described equation (1) is satisfied for each data of the target number of days N (for example, for January) for each combination of agent and shift by reference to the past allocation data 400. Then, the extraction unit 602 extracts the data as the data violating the explicit constraint condition in the case where the above-described equation (1) is not satisfied.

Here, a specific example of the conflict set data, which is a set of the data violating the explicit constraint condition (1), will be described with reference to FIG. 7. The explicit constraint condition (1) corresponds to the above-described equation (1).

FIG. 7 is an explanatory diagram illustrating a specific example of conflict set data. FIG. 7 illustrates conflict set data 700-1 to 700-X. The conflict set data 700-1 to 700-X correspond to the allocation data 400-1 to 400-X in the past allocation data 400, respectively.

For example, the conflict set data 700-1 is a set of data violating the explicit constraint condition (1), which is extracted from the allocation data 400-1 in the past allocation data 400. Furthermore, the conflict set data 700-X is a set of data violating the explicit constraint condition (1), which is extracted from the allocation data 400-X in the past allocation data 400.

The classification unit 603 classifies the extracted conflict set data 700-1 to 700-X into a plurality of groups according to a predetermined criterion. Here, a case of classifying the conflict set data by agent type is assumed. In this case, the data included in the conflict set data 700-1 to 700-X are classified into groups for each agent.

The calculation unit 604 calculates the relative frequency value for each allocation pattern of resources on the basis of the conflict set data of each of the plurality of classified groups. For example, focusing on the group of agent1, the relative frequency value for each allocation pattern (combination of variables) is calculated for the group (agent1) and the other groups (agent2, 3, 4, and 5).

Specifically, for example, the calculation unit 604 calculates the lift value for each combination of variables as the relative frequency value, using the following equation (2) with the agent and shift as a combination of variables (allocation pattern). Note that I(i, k) represents the lift value of a combination of agent i and shift k. $\Sigma_{j \in N} x_{ijk}$ represents the number of conflicts of shift k of agent i. The number of conflicts is the number of portions that are "1" in the conflict set data of each group, assuming that they are in conflict due to the shift. $\Sigma_{k \in W} \Sigma_{j \in N} x_{ijk}$ represents the total number of conflicts of agent i. $\Sigma_{i \in M} \Sigma_{j \in N} x_{ijk}$ represents the total number of conflicts of shift k. $\Sigma_{i \in M} \Sigma_{k \in W} \Sigma_{j \in N} x_{ijk}$ represents the total number of conflicts.

[Math. 2]

$$I(i, k) = \frac{\sum_{j \in N} x_{ijk} / \sum_{k \in W} \sum_{j \in N} x_{ijk}}{\sum_{i \in M} \sum_{j \in N} x_{ijk} / \sum_{i \in M} \sum_{k \in W} \sum_{j \in N} x_{ijk}} \quad (2)$$

Figure 8:
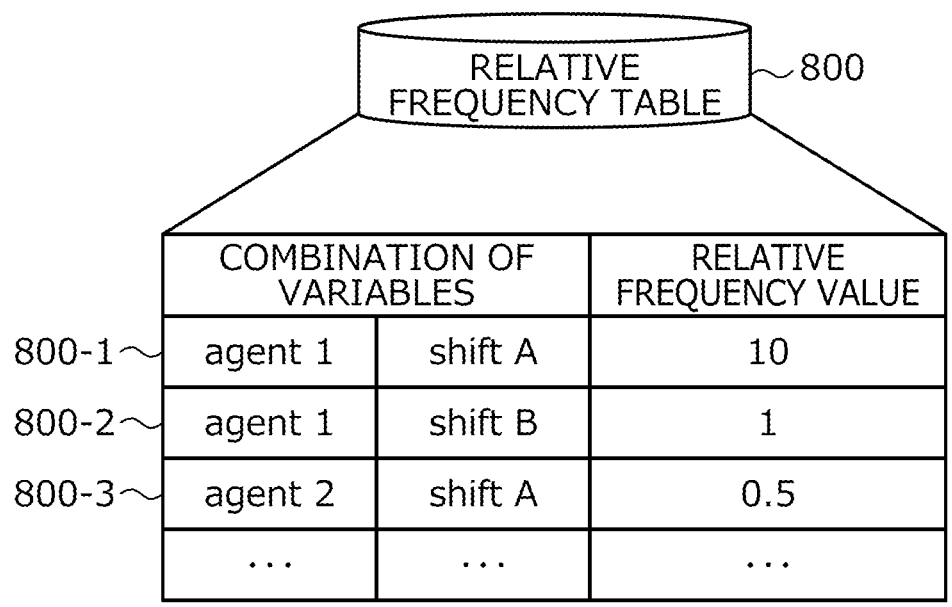
FIG. 8 is an explanatory diagram illustrating an example of stored content in a relative frequency table 800.

The calculated relative frequency value for each combination of variables (allocation pattern) is stored in a relative frequency table 800 as illustrated in FIG. 8, for example. The relative frequency table 800 is implemented by, for example, a storage device such as the memory 302 or the disk 304 illustrated in FIG. 3.

FIG. 8 is an explanatory diagram illustrating an example of stored content in the relative frequency table 800. In FIG. 8, the relative frequency table 800 has fields for the combination of variables and the relative frequency value, and stores relative frequency information (for example, relative frequency information 800-1 to 800-3) as record by setting information in each field.

Here, the combination of variables indicates a resource allocation pattern (a combination of a resource and an allocation destination). The relative frequency value indicates the relative frequency value of the combination of variables. For example, the relative frequency information 800-1 indicates the relative frequency value "10" of (agent1, shiftA).

The generation unit 605 generates the potential constraint condition on the basis of the calculated relative frequency value for each combination of variables. Specifically, for example, the generation unit 605 generates the potential constraint condition for the combination of variables having the relative frequency value equal to or larger than the threshold value a, by reference to the relative frequency table 800.

Here, a case in which the relative frequency value "10" of (agent1, shiftA) is equal to or larger than the threshold value α is assumed. In this case, the generation unit 605 calculates the number of co-occurrence of the combination of agent1 and shiftA for each predetermined period (for example, one month) with reference to the past allocation data 400, for example. Note that the co-occurrence means that the value becomes "1".

The number of co-occurrence of the combination of agent1 and shiftA in a predetermined period corresponds to the number of times shiftA is allocated to agent1 in the predetermined period. Next, the generation unit 605 sets the minimum number among the numbers calculated for each predetermined period as the boundary value, for example. The boundary value can be obtained by, for example, the following equation (3). Note that T represents the boundary value.

[Math. 3]

$$\tau = \min\left\{\sum_{j=p}^{P+1} x_{(agent1)j(shiftA)}, p = 1, 2, \ldots, X(month)\right\} \quad (3)$$

The boundary value τ indicates at least how many times shiftA is allocated to agent1 in the predetermined period. Then, the generation unit 605 generates the potential constraint condition for the combination of agent1 and shiftA as described in the following equation (4), using the boundary value τ. Note that τ represents the degree that agent1 prefers shiftA (minimum required number).

[Math. 4]

$$\sum_{j \in N} x_{(agent1)j(shiftA)} \geq \tau \quad (4)$$

The above-described equation (4) indicates the potential constraint condition that agent1 prefers shiftA, and shiftA is allocated to agent1 at least τ times in a predetermined period N (for example, one month).

Note that, in the above description, the minimum number among the numbers calculated for each predetermined period is set as the boundary value, but the embodiment is not limited thereto. For example, the generation unit 605 may also set an average value of the numbers calculated for each predetermined period as the boundary value, or may also set the maximum number among the numbers calculated for each predetermined period as the boundary value.

(Method of Coping Case where Potential Constraint Condition is Subset of Explicit Constraint Condition)

Next, a method of coping a case where the potential constraint condition is a subset of the explicit constraint condition will be described with reference to FIG. 9.

Figure 9:
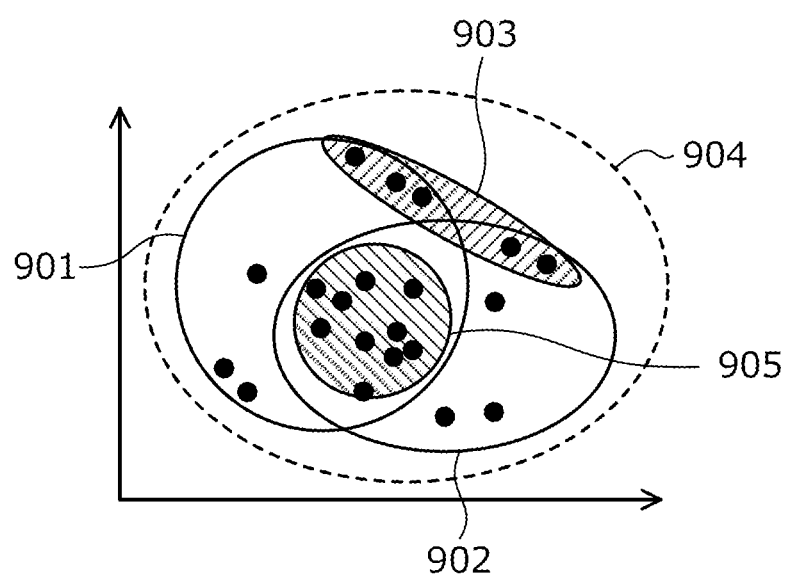
FIG. 9 is an explanatory diagram illustrating ranges that satisfy constraint conditions.

FIG. 9 is an explanatory diagram illustrating ranges that satisfy the constraint conditions. In FIG. 9, a range 901 indicates a range that satisfies a first explicit constraint condition. A range 902 indicates a range that satisfies a second explicit constraint condition. A range 903 indicates a range that satisfies the potential constraint. A dotted range 904 indicates the entire space. The black dots represent data (allocation results).

For example, the explicit constraint condition is "every employee works at least once on weekends" and the potential constraint condition is "some employees cannot work at midnight on weekends (for child care)". In this case, the potential constraint condition is the subset of the explicit constraint condition. Therefore, it is not regarded as a violation simply because of the reciprocity with the explicit constraint condition, and the potential constraint condition may not be generated.

For example, the range 903 that satisfies a potential constraint partially overlaps with the range 901 that satisfies the first explicit constraint condition. Similarly, the range 903 that satisfies a potential constraint partially overlaps with the range 902 that satisfies the second explicit constraint condition.

Therefore, for example, the extraction unit 602 may also set a condition (corresponding to the range 905) common to the plurality of explicit constraint conditions as the known constraint condition (first condition) for generating the potential constraint condition. Specifically, for example, the extraction unit 602 focuses on the commonality of the plurality of explicit constraint conditions and generates a condition that satisfies all the plurality of explicit constraint conditions as the conflict candidate condition conflicting with the potential constraint condition.

For example, the plurality of explicit constraint conditions is assumed to be "every employee works at least once on weekends" and "every employee works at least once at midnight". In this case, the extraction unit 602 generates a condition that "every employee works at least once at midnight on weekends" as the conflict candidate condition. Furthermore, the extraction unit 602 may also generate a condition having a smaller range defined by the condition as the conflict candidate condition, for example.

Then, the extraction unit 602 sets the generated conflict candidate condition as the known constraint condition for generating the potential constraint condition. In this case, the extraction unit 602 extracts the data violating the generated conflict candidate condition from the acquired allocation data. As a result, even in the case where the potential constraint condition is the subset of the explicit constraint condition, the violating data can be extracted and the potential constraint condition can be generated.

(Information Processing Procedure of Allocation Support Server 201)

Next, an information processing procedure of the allocation support server 201 according to the first embodiment will be described with reference to FIG. 10.

Figure 10:
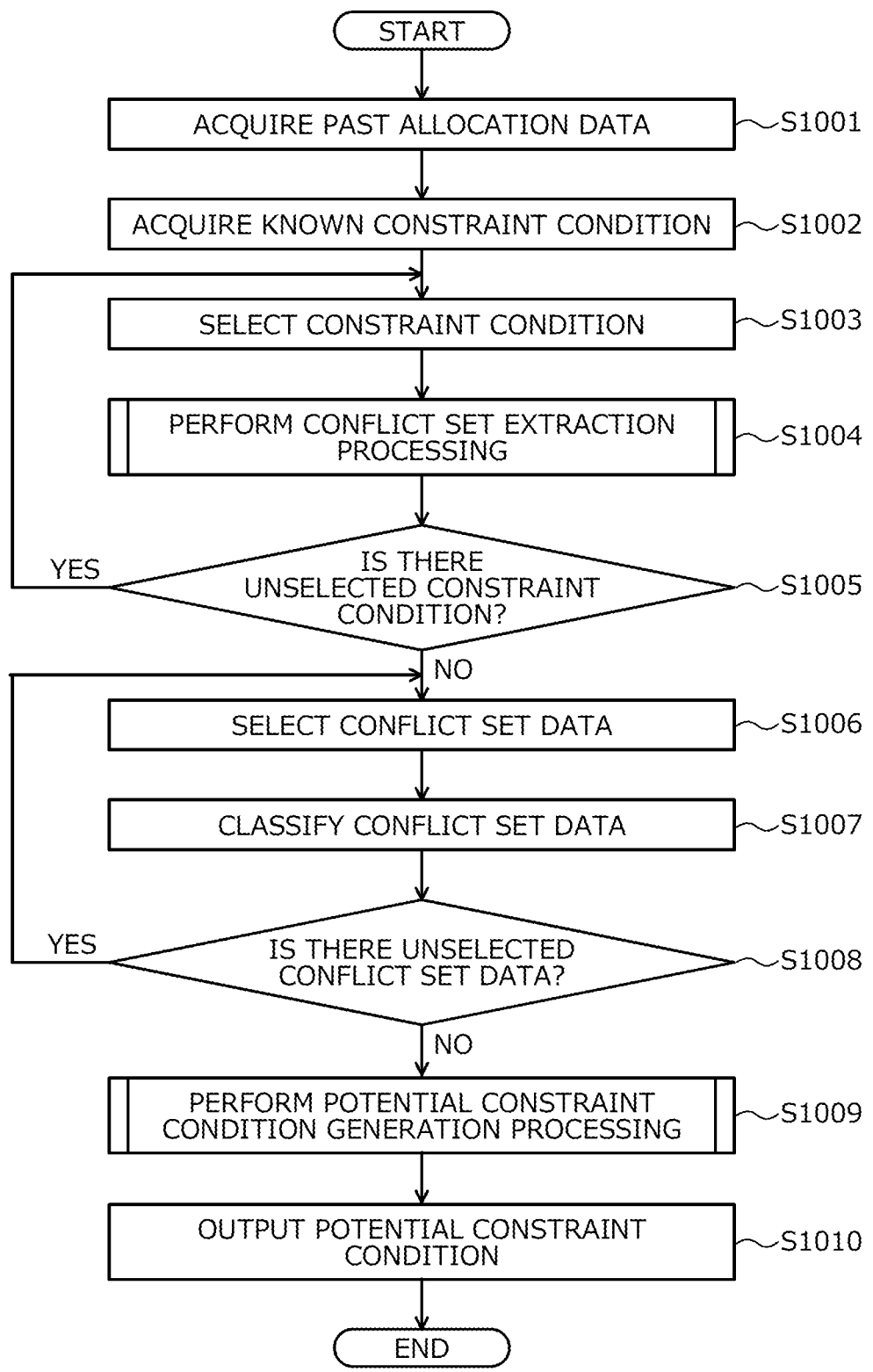
FIG. 10 is a flowchart illustrating an example of an information processing procedure of the allocation support server 201 according to the first embodiment.

FIG. 10 is a flowchart illustrating an example of the information processing procedure of the allocation support server 201 according to the first embodiment. In the flowchart of FIG. 10, first, the allocation support server 201 acquires the past allocation data (step S1001). Next, the allocation support server 201 acquires the known constraint condition from the constraint condition DB 220 (step S1002).

Then, the allocation support server 201 selects an unselected constraint condition that has not been selected from the acquired known constraint conditions as the explicit constraint condition (step S1003). Next, the allocation support server 201 executes conflict set extraction processing of extracting data that violates the selected corresponding explicit constraint condition (step S1004). A specific processing procedure of the conflict set extraction processing will be described below with reference to FIG. 11.

Then, the allocation support server 201 determines whether there is an unselected constraint condition that has not been selected from the acquired known constraint conditions (step S1005). Here, in the case where an unselected constraint condition remains (step S1005: Yes), the allocation support server 201 returns to step S1003.

On the other hand, in the case where no unselected constraint condition remains (step S1005: No), the allocation support server 201 selects unselected conflict set data that has not been selected from the extracted conflict set data (step S1006). Next, the allocation support server 201 classifies the selected conflict set data into a plurality of groups according to a predetermined criterion (step S1007).

Then, the allocation support server 201 determines whether there is unselected conflict set data that has not been selected from the extracted conflict set data (step S1008). Here, in the case where unselected conflict set data remains (step S1008: Yes), the allocation support server 201 returns to step S1006.

On the other hand, in the case where no unselected conflict set data remains (step S1008: No), the allocation support server 201 executes potential constraint condition generation processing on the basis of the conflict set data of each of the plurality of classified groups (step S1009). A specific processing procedure of the potential constraint condition generation processing will be described below with reference to FIG. 12.

Then, the allocation support server 201 outputs the generated potential constraint condition (step S1010) and terminates a series of processing according to the present flowchart.

Thereby, the potential constraint condition set on the basis of preferences of a specific individual or team can be automatically extracted. For example, when the allocation support server 201 outputs the generated potential constraint condition to the client device 202, a constraint condition display screen 1300 as illustrated in FIG. 13 to be described below is displayed.

Next, a specific processing procedure of the conflict set extraction processing of step S1004 illustrated in FIG. 10 will be described with reference to FIG. 11.

Figure 11:
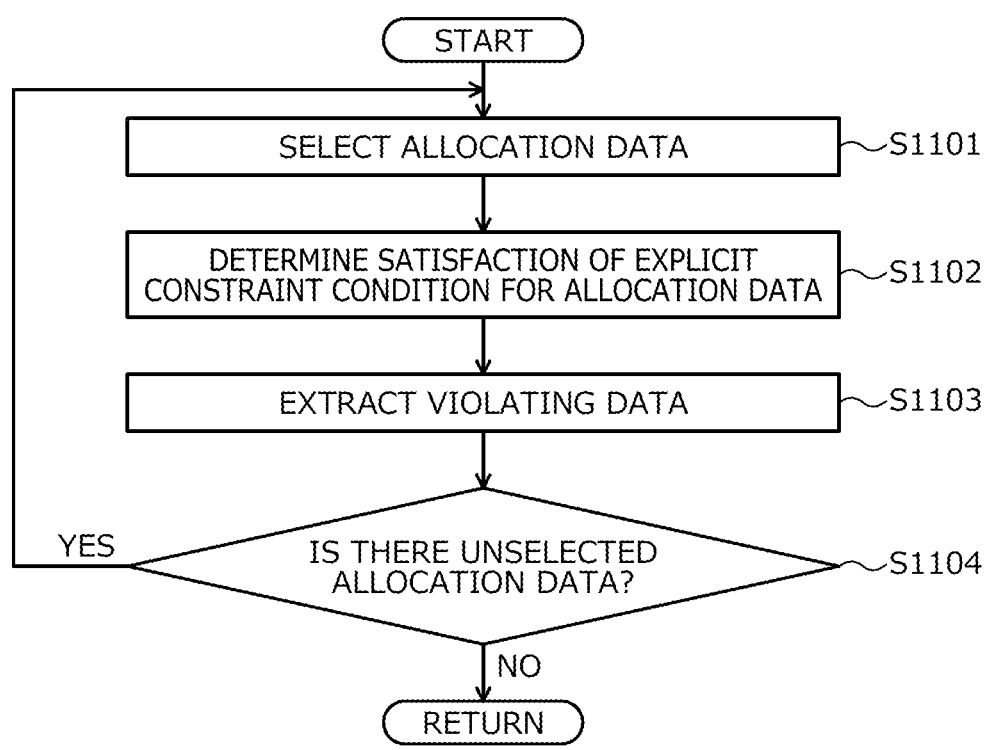
FIG. 11 is a flowchart illustrating an example of a specific processing procedure of conflict set extraction processing.

FIG. 11 is a flowchart illustrating an example of a specific processing procedure of the conflict set extraction processing. In the flowchart of FIG. 11, first, the allocation support server 201 selects unselected allocation data that has not been selected from the acquired past allocation data (step S1101). Then, the allocation support server 201 determines satisfaction of the selected explicit constraint condition for the selected allocation data (step S1102).

Next, the allocation support server 201 extracts data that violates the explicit constraint condition from the selected allocation data by reference to the satisfaction determination result (step S1103). Then, the allocation support server 201 determines whether there is allocation data that has not been selected among the acquired past allocation data (step S1104).

Here, in the case where unselected allocation data remains (step S1104: Yes), the allocation support server 201 returns to step S1101. On the other hand, in the case where no unselected allocation data remains (step S1104: No), the allocation support server 201 returns to the step in which the conflict set extraction processing has been called.

As a result, it is possible to extract the data of the violation portion that does not satisfy the explicit constraint condition from each allocation data and obtain the conflict set data.

Next, a specific processing procedure of the potential constraint condition generation processing of step S1009 illustrated in FIG. 10 will be described with reference to FIG. 12.

Figure 12:
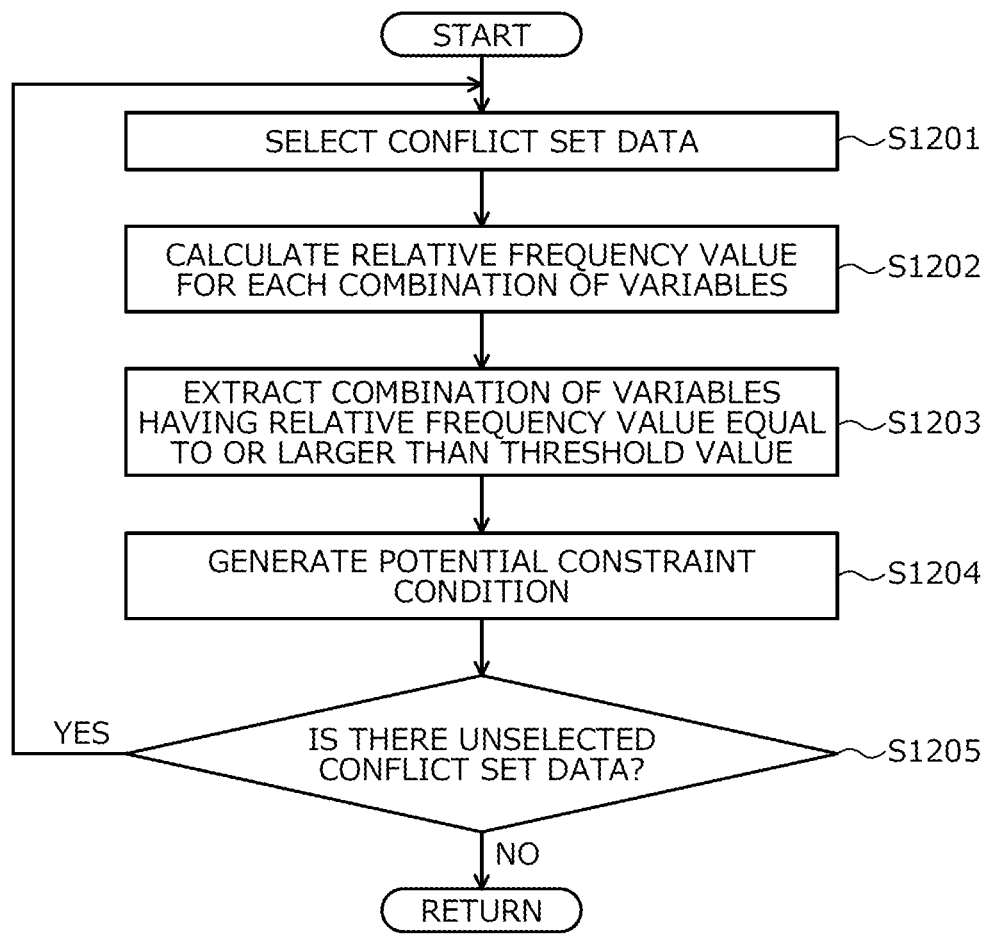
FIG. 12 is a flowchart illustrating an example of a specific processing procedure of potential constraint condition generation processing.

FIG. 12 is a flowchart illustrating an example of a specific processing procedure of the potential constraint condition generation processing. In the flowchart of FIG. 12, first, the allocation support server 201 selects unselected conflict set data that has not been selected from the conflict set data of each of the plurality of classified groups (step S1201).

Then, the allocation support server 201 calculates the relative frequency value for each combination of variables representing the resource allocation pattern on the basis of the selected conflict set data (step S1202). Next, the allocation support server 201 extracts a combination of variables having the calculated relative frequency value equal to or larger than the threshold value a (step S1203).

Then, the allocation support server 201 generates the potential constraint condition for the extracted combination of variables by reference to the acquired past allocation data (step S1204). Next, the allocation support server 201 determines whether there is unselected conflict set data that has not been selected from the conflict set data of each of the plurality of classified groups (step S1205).

Here, in the case where unselected conflict set data remains (step S1205: Yes), the allocation support server 201 returns to step S1201. On the other hand, in the case where no unselected conflict set data remains (step S1205: No), the allocation support server 201 returns to the step in which the potential constraint condition generation processing has been called.

Thereby, the allocation pattern (combination of variables) frequently occurring in an individual or team is detected on the basis of the relative frequency value calculated from the conflict set data classified for each individual or team, and the constraint condition (potential constraint condition) for the allocation pattern can be extracted.

(Screen Example of Constraint Condition Display Screen 1300)

Next, the constraint condition display screen 1300 displayed on the client device 202 will be described with reference to FIG. 13.

FIG. 13 is an explanatory diagram illustrating a screen example of the constraint condition display screen. In FIG. 13, the constraint condition display screen 1300 is an example of an operation screen displaying the potential constraint condition for each team generated by the allocation support server 201. According to the constraint condition display screen 1300, the person in charge of allocation can grasp the potential constraint condition that is difficult to find out in advance in an interview, as the constraint condition to be considered, when creating the agent scheduling of each team. Furthermore, the person in charge of allocation can compare the potential constraint conditions between teams and analyze a trend of each team.

For example, the person in charge of allocation can grasp that Agent1 of Team1 prefers ShiftA (22:00-06:00) and there is the potential constraint condition for that. Note that detailed content of the potential constraint condition may also be able to be confirmed on the constraint condition display screen 1300 when Team1 is selected by the user's operation input using an input device (not illustrated), for example.

As described above, according to the allocation support server 201 of the first embodiment, the past allocation data is acquired, the data violating the explicit constraint condition is extracted from the acquired past allocation data, the extracted data is classified into a plurality of groups according to a predetermined criterion, and then according to the allocation support server 201, the relative frequency value of the allocation pattern of resources included in the plurality of resources is calculated on the basis of the data of each of the plurality of classified groups, and the potential constraint condition for the allocation pattern can be generated on the basis of the calculated relative frequency value.

Thereby, the potential constraint condition set on the basis of preferences of a specific individual or team can be automatically extracted.

Furthermore, according to the allocation support server 201, the resource allocation pattern (combination of variables) having calculated relative frequency value equal to or larger than the threshold value α is specified, and the potential constraint condition for the specified allocation pattern can be generated on the basis of the past allocation data.

Thereby, the allocation pattern (combination of variables) frequently occurring in a specific individual or team can be detected and the constraint condition (potential constraint condition) for the allocation pattern can be extracted.

Furthermore, according to the allocation support server 201, the data violating the explicit constraint condition relating to fairness uniformly applied to a plurality of resources can be extracted from the acquired past allocation data.

Thereby, the potential constraint condition set on the basis of preferences of a specific individual or team can be accurately extracted.

Furthermore, according to the allocation support server 201, the extracted data (conflict set data) can be classified into a plurality of groups according to a predetermined criterion for each predetermined period.

Thereby, it is possible to cope with the case where the constraint condition for optimizing the resource allocation changes over time due to an influence of a period (for example, a season of a busy period, the end of a new employee period, or the like).

Furthermore, according to the allocation support server 201, in the case where new allocation data is acquired after the potential constraint condition is generated on the basis of certain allocation data, whether the resources to be allocated are similar between the certain allocation data and the new allocation data can be determined. Then, according to the allocation support server 201, in the case where the resources to be allocated are similar, using the same explicit constraint condition as the certain allocation data, the data violating the corresponding explicit constraint condition can be extracted from the new allocation data.

Thereby, the potential constraint condition can be efficiently generated using the explicit constraint condition that has been actually used to generate the potential constraint condition using another allocation data having a similar allocation target.

Furthermore, according to the allocation support server 201, a condition common to a plurality of explicit constraint conditions is generated as conflict candidate condition, and the data violating the conflict candidate condition can be extracted from the acquired allocation data, using the generated conflict candidate condition as a known constraint condition (first condition).

As a result, even in the case where the potential constraint condition is the subset of the explicit constraint condition, the violating data can be extracted and the potential constraint condition can be generated.

Furthermore, according to the allocation support server 201, the generated potential constraint condition can be output.

Thereby, the potential constraint condition set on the basis of preferences of a specific individual or team can be presented to the person in charge of allocation, or the like.

(Another Example of Generating Potential Constraint Condition)

Here, as another example of generating the potential constraint condition, a case applied to the operating room scheduling such as a hospital will be described.

In the case of operating room scheduling, the following conditions can be mentioned as the constraint conditions.

Example of Explicit Constraint Condition

"In every operation, the number of operations (=the number of times the operating room is used) is X times or less in total per month (or the operation time is X hours or less)"

"Be sure to have X or more surgical assistants and nurses for every operation"

"Evenly allocate rooms for management maintenance/improvement (achievement of a certain operating room operation rate)"

"Evenly allocate surgical assistants and nurses for management maintenance/improvement (achievement of a certain resource operation rate)"

"Allocate a room (frame) in advance for each diagnosis and treatment department to make it easier to understand the business situation"

Example of Potential Constraint Condition

"A certain operation is performed only in a specific room (due to use of special equipment)"

"A certain operation is performed in two specific rooms (due to needs of movement, transport, and the like)"

"A specific set of surgeon/surgical assistant/nurse is allocated to a certain operation (due to special skill requirement)"

"Rooms other than (a frame of) rooms allocated in advance may also be allocated to operations in a certain diagnosis and treatment department (to handle urgent patients)."

The processing flow is similar to the case of agent scheduling. Note that the resources to be allocated and the allocation destination are as follows, for example:

Resources: room and equipment

Allocation destination: operation

Here, the explicit constraint condition used to extract the potential constraint condition is given by the following equation (5). The following equation (5) is a constraint condition for evenly allocating rooms for business maintenance/improvement.

[Math. 5]

$$\frac{O_i}{ML} - \sigma \leq \sum_{j \in N} \sum_{l \in L} x_{ijkl} \leq \frac{O_i}{ML} + \sigma \quad (5)$$

Note that i represents a subscript of operation. j represents a subscript of day. k represents a subscript of room. l represents a subscript of equipment. $x_{ijkl}$ is "1" when room k and equipment l in day j are used in operation i, and "0" in other cases. O represents the number of times operation i is performed. M represents the number of rooms. N represents the target number of days. L represents the number of equipment. σ represents a variation tolerance offset of uniformity.

In this case, the allocation support server 201 generates the potential constraint condition as expressed using, for example, the following equations (6) and (7). Note that τ represents the degree (minimum required number) that operation1 is performed in roomA with equipmentI.

[Math. 6]

$$\sum_{j \in N} x_{(operation1)j(roomA)(equipmentI)} \geq \tau \quad (6)$$

$$\tau = \min\left\{\sum_{j=p}^{P+1} x_{(operation1)j(roomA)(equipmentI)}, \; p = 1, 2, \ldots, X(\text{month})\right\} \quad (7)$$

The above-described equation (6) above indicates the potential constraint condition of using room A and equipment I in operation 1.

Second Embodiment

Next, an allocation support server 201 according to a second embodiment will be described. In the second embodiment, a case where the potential constraint condition generated by the allocation support server 201 according to the first embodiment is utilized for optimization of resource allocation will be described. A part same as the part described in the first embodiment is denoted with the same reference numeral, and illustration and description thereof are omitted.

(Functional Configuration Example of Allocation Support Server 201)

First, a functional configuration example of the allocation support server 201 according to the second embodiment will be described with reference to FIG. 14.

Figure 14:
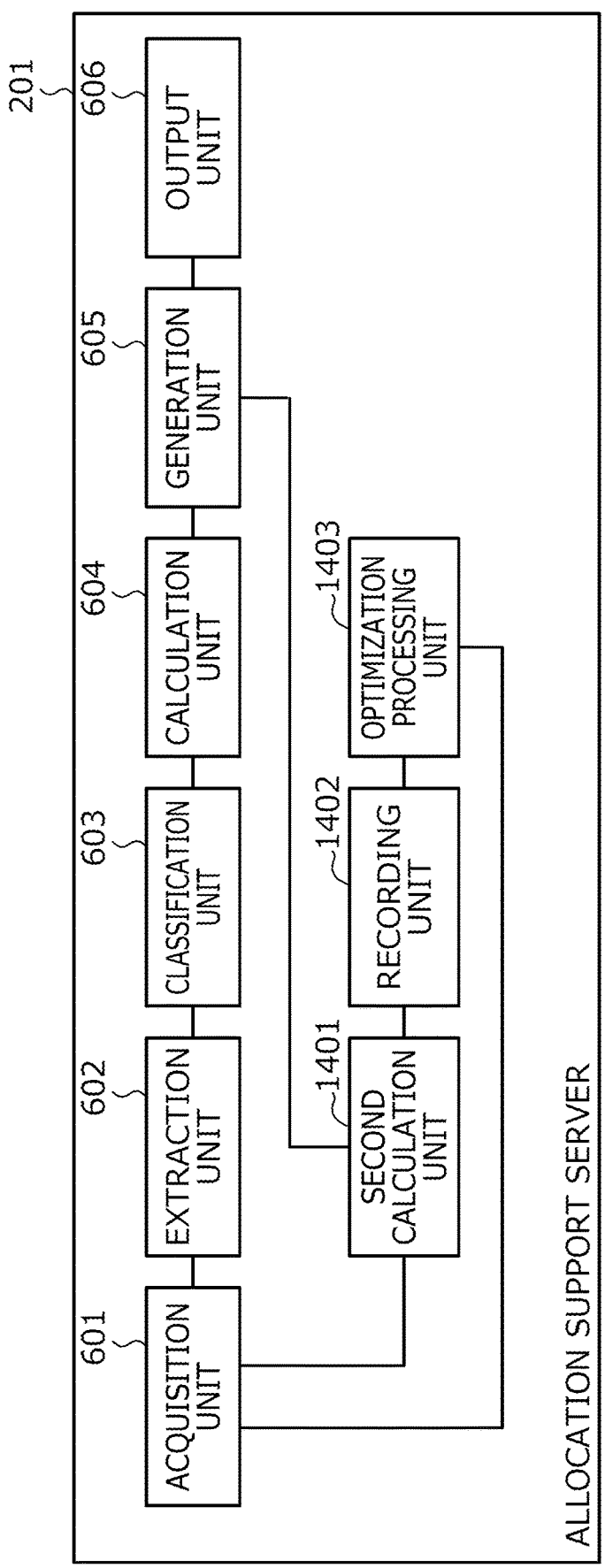
FIG. 14 is a block diagram illustrating a functional configuration example of an allocation support server 201 according to a second embodiment.

FIG. 14 is a block diagram illustrating a functional configuration example of the allocation support server 201 according to the second embodiment. In FIG. 14, the allocation support server 201 includes an acquisition unit 601, an extraction unit 602, a classification unit 603, a calculation unit 604, a generation unit 605, an output unit 606, a second calculation unit 1401, and a recording unit 1402, and optimization processing unit 1403. The acquisition unit 601 to the output unit 606, and the second calculation unit 1401 to the optimization processing unit 1403 have functions serving as a control unit, and specifically, for example, those functions are implemented by a program stored in a storage device such as a memory 302, a disk 304, or a portable recording medium 307 illustrated in FIG. 3 executed by a CPU 301 or by a communication I/F 305. A processing result of each functional unit is stored in, for example, a storage device such as the memory 302 or the disk 304. Here, only the functional units different from the allocation support server 201 according to the first embodiment will be described.

The second calculation unit 1401 calculates a satisfaction rate in past allocation data of a potential constraint condition generated by the generation unit 605. The past allocation data is allocation data acquired by the acquisition unit 601 and is, for example, past allocation data 400 illustrated in FIG. 4. The satisfaction rate is an index value indicating how much the past allocation data satisfies the potential constraint condition.

Specifically, for example, the second calculation unit 1401 determines a violation on the past allocation data for the generated potential constraint condition. Then, the second calculation unit 1401 calculates the ratio of a non-violation portion in the whole portion (whole portion—violation portion) of the combination of variables targeted by the potential constraint condition as the satisfaction rate.

For example, assuming a case applied to agent scheduling, when the number of agents targeted by the potential constraint condition is "3", a shift pattern is "2", and the target number of days is "30", the whole portion becomes "3×2×30=180". Furthermore, the violation portions (the total number of violations where a shift of a certain person of a certain day is 1) of the whole portion are "14". In this case, the satisfaction rate is, for example, "(180−14)/180≈0.92".

The recording unit 1402 records the calculated satisfaction rate in association with the past allocation data and the potential constraint condition. Specifically, for example, the recording unit 1402 records the past allocation data, the potential constraint condition, and the satisfaction rate in association with each other in a DB with constraint conditions 1600 as illustrated in FIG. 16 to be described below. The DB with constraint conditions 1600 is implemented by a storage device such as the memory 302, or the disk 304, for example.

Note that the recording unit 1402 may also record the past allocation data and the potential constraint condition in association with each other only in the case where the calculated satisfaction rate is equal to or larger than a fixed value (threshold value β to be described below), for example.

The optimization processing unit 1403 calculates similarity between data to be optimized and the past allocation data. Here, the data to be optimized is, for example, allocation data to be optimized. The data to be optimized is acquired by the acquisition unit 601. The similarity is an index value indicating how similar the data to be optimized and the past allocation data are.

The similarity of the data to be optimized to the past allocation data is determined from, for example, complexity of a problem of the data to be optimized (such as the number of variables) and commonality of resources to be allocated. Furthermore, in the case of agent scheduling, the similarity may also be determined from the number of agents to be allocated, the similarity of shift patterns, and the like.

Specifically, for example, the optimization processing unit 1403 may also set the similarity between the data to be optimized and the past allocation data to "large" in a case where the numbers of variables of the problem are the same and the resources to be allocated are common. Furthermore, the optimization processing unit 1403 may also set the similarity between the data to be optimized and the past allocation data to "medium" in a case where the numbers of variables of the problem are the same but the resources to be allocated are not common. Furthermore, the optimization processing unit 1403 may also set the similarity between the data to be optimized and the past allocation data to "small" in a case where the numbers of variables of the problem are not the same and the resources to be allocated are not common.

The optimization processing unit 1403 determines, on the basis of the calculated satisfaction rate of the potential constraint condition in the past allocation data and the calculated similarity between the data to be optimized and the corresponding past allocation data, whether to apply the corresponding potential constraint condition to the data to be optimized.

Specifically, for example, the optimization processing unit 1403 may also determine to apply the potential constraint condition to the data to be optimized in a case where the satisfaction rate is equal to or larger than a threshold value $\beta$, and the similarity is equal to or larger than a threshold value $\gamma$. Furthermore, the optimization processing unit 1403 may also determine not to apply the potential constraint condition to the data to be optimized in a case where the satisfaction rate is less than the threshold value $\beta$ or the similarity is less than the threshold value $\gamma$. The threshold values $\beta$ and $\gamma$ can be arbitrarily set.

Note that the processing of optimizing the data to be optimized using the potential constraint condition may also be performed on the allocation support server 201, or another computer different from the allocation support server 201 (for example, a client device 202).

(Operation Example of Allocation Support Server 201)

Here, an operation example of the allocation support server 201 according to the second embodiment will be described with reference to FIGS. 15 to 17.

Figure 15:
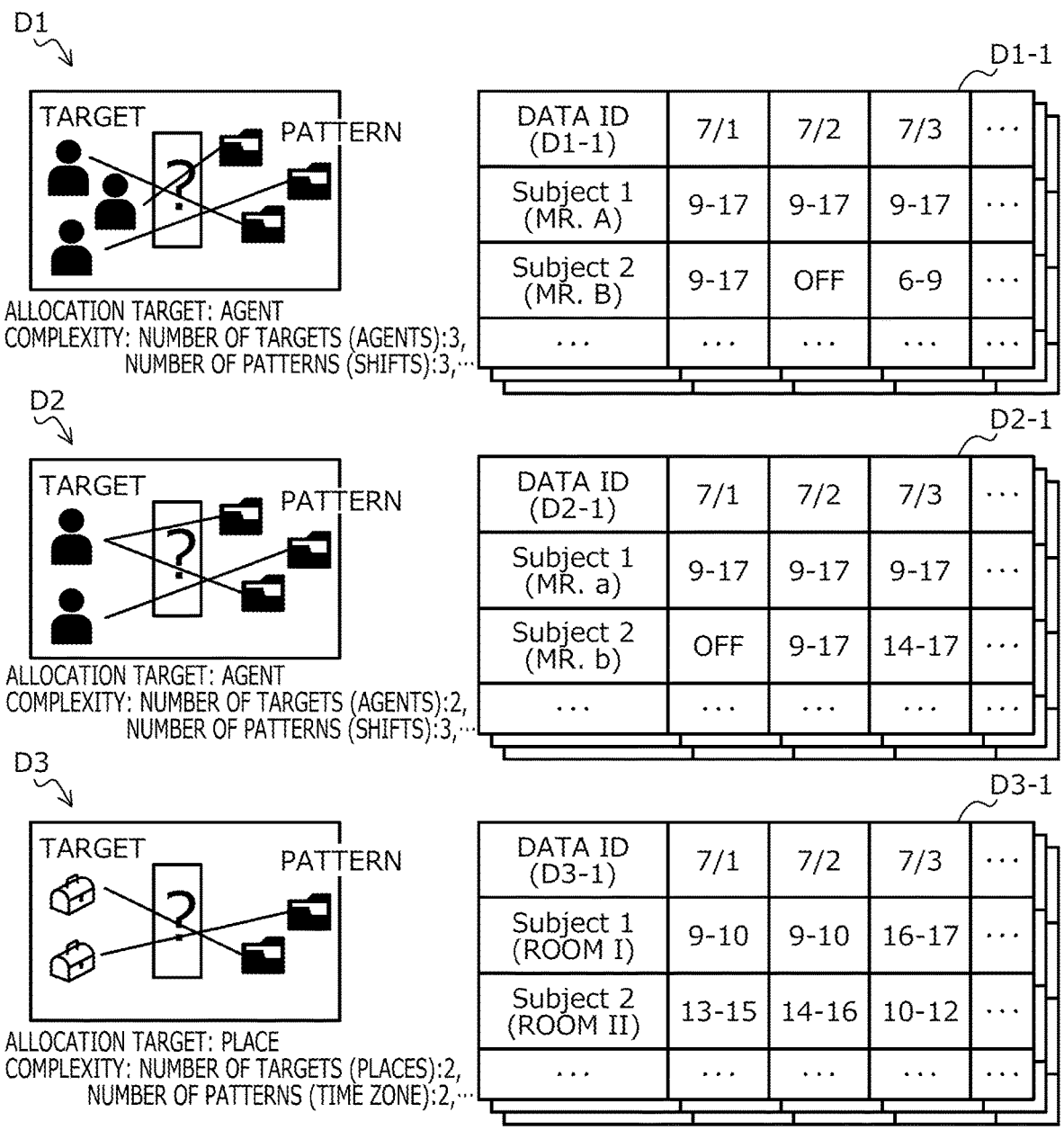
FIG. 15 is an explanatory diagram illustrating a specific example of past allocation data.

FIG. 15 is an explanatory diagram illustrating a specific example of the past allocation data. In FIG. 15, allocation data D1-1 is an example of allocation data indicating an allocation result for problem D1 (the allocation target: agent, the complexity: the number of targets (agents) "3", the number of patterns (shifts): "3", . . . ). Allocation data D2-1 is an example of allocation data indicating an allocation result for problem D2 (the allocation target: agent, the complexity: the number of targets (agents) "2", the number of patterns (shifts): "3", . . . ). Allocation data D3-1 is an example of allocation data indicating an allocation result for problem D3 (the allocation target: place, the complexity: the number of targets (places) "3", the number of patterns (time zone): "2", . . . ).

Here, the potential constraint condition generated by the allocation support server 201 is given by the following equation (8). Furthermore, a condition ID of this potential constraint condition is "Cx".

[Math. 7]

$$\sum_{j \in N} x_{(subject(i))j(pattern(k))} \geq \tau \quad (8)$$

In this case, the second calculation unit 1401 calculates the satisfaction rate of the potential constraint condition Cx in each of the allocation data D1-1, D2-1, and D3-1 by using, for example, the above-described equation (8).

Then, the recording unit 1402 records the calculated satisfaction rate in the DB with constraint conditions 1600 as illustrated in FIG. 16 in association with each of allocation data D1-1, D2-1, and D3-1 and the potential constraint condition Cx. Here, stored content of the DB with constraint conditions 1600 will be described.

FIG. 16 is an explanatory diagram illustrating an example of the stored content in the DB with constraint conditions 1600. In FIG. 16, the DB with constraint conditions 1600 has fields of condition ID, data ID, and satisfaction rate, and stores data with constraint conditions (for example, data with constraint conditions 1600-1 to 1600-3) as records by setting information in the fields.

Here, the condition ID is an identifier that uniquely identifies the constraint condition (potential constraint condition). The data ID is an identifier that uniquely identifies the past allocation data. The satisfaction rate indicates the satisfaction rate of the potential constraint condition of the condition ID in the allocation data with the data ID. For example, the data with constraint condition 1600-1 indicates the satisfaction rate "1.0" of the potential constraint condition Cx in the past allocation data D1-1.

Figure 17:
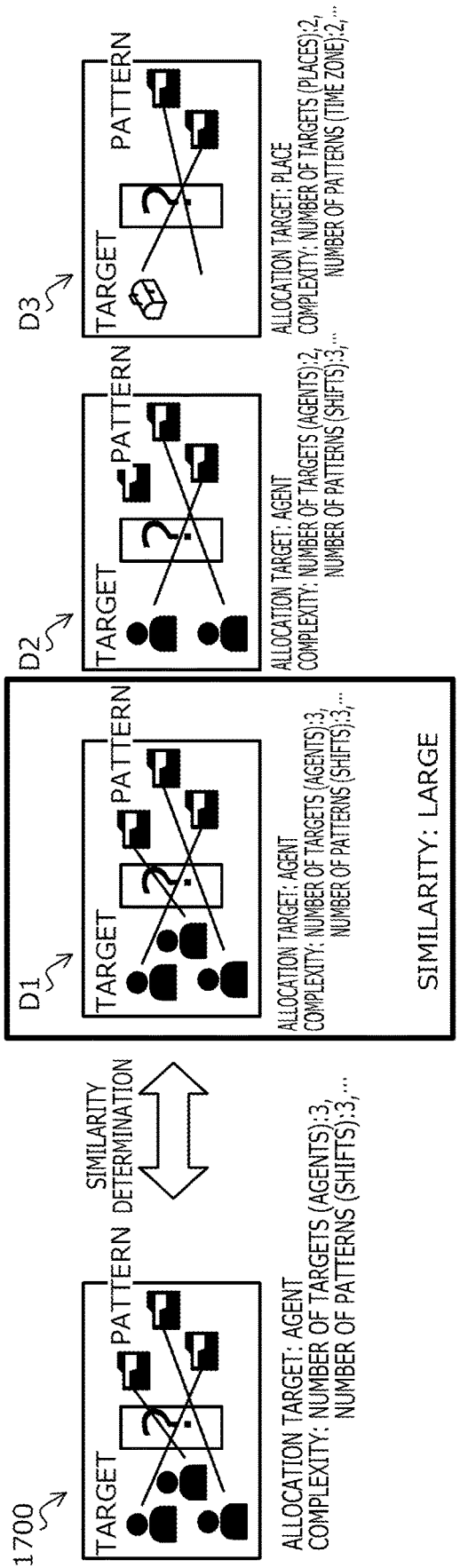
FIG. 17 is an explanatory diagram illustrating an example of calculating a similarity to past allocation data.

FIG. 17 is an explanatory diagram illustrating an example of calculating similarity to the past allocation data. In FIG. 17, the optimization processing unit 1403 calculates the similarity between the data to be optimized and the past allocation data D1-1, D2-1, and D3-1. Here, a problem 1700 of the data to be optimized is "the allocation target: agent, the complexity: the number of targets (agents): "3", and the number of patterns (shifts): "3", . . . ".

In this case, the optimization processing unit 1403 compares the problem 1700 of the data to be optimized and the problem D1, and sets the similarity to the past allocation data D1-1 having the same allocation target (agent) and the same number of targets (agents) and the same number of patterns (shifts) to be "large". Furthermore, the optimization processing unit 1403 compares the problem 1700 of the data to be optimized and the problem D2, and sets the similarity to the past allocation data D2-1 having the same allocation target (agent) and a different number of targets (agents) to be "medium". Furthermore, the optimization processing unit 1403 compares the problem 1700 of the data to be optimized and the problem D3, and sets the similarity to the past allocation data D3-1 having a different allocation target to be "small".

Then, the optimization processing unit 1403 specifies the past allocation data having the similarity of "large" (threshold value $\gamma$=large). Here, the allocation data D1-1 is specified. Next, the optimization processing unit 1403 refers to the DB with constraint conditions 1600 and specifies the satisfaction rate of the potential constraint condition in the allocation data D1-1. Here, the satisfaction rate "1.0" of the potential constraint condition Cx is specified.

Then, the optimization processing unit 1403 determines to apply the potential constraint condition Cx to the data to be optimized in the case where the specified satisfaction rate "1.0" of the potential constraint condition Cx is equal to or larger than the threshold value $\beta$. On the other hand, the optimization processing unit 1403 determines not to apply the potential constraint condition Cx to the data to be optimized in the case where the satisfaction rate "1.0" of the potential constraint condition Cx is less than the threshold value $\beta$.

Here, assuming that the threshold value $\beta$ is "$\beta$=0.8", the optimization processing unit 1403 determines to apply the potential constraint condition Cx to the data to be optimized because the satisfaction rate "1.0" of the potential constraint condition Cx is equal to or larger than the threshold value $\beta$.

(Optimization Processing Procedure of Allocation Support Server 201)

Next, an optimization processing procedure of the allocation support server 201 according to the second embodiment will be described with reference to FIGS. 18 and 19. This optimization processing is executed, for example, after information processing of the allocation support server 201 illustrated in FIG. 10 is executed at least once.

Figure 18:
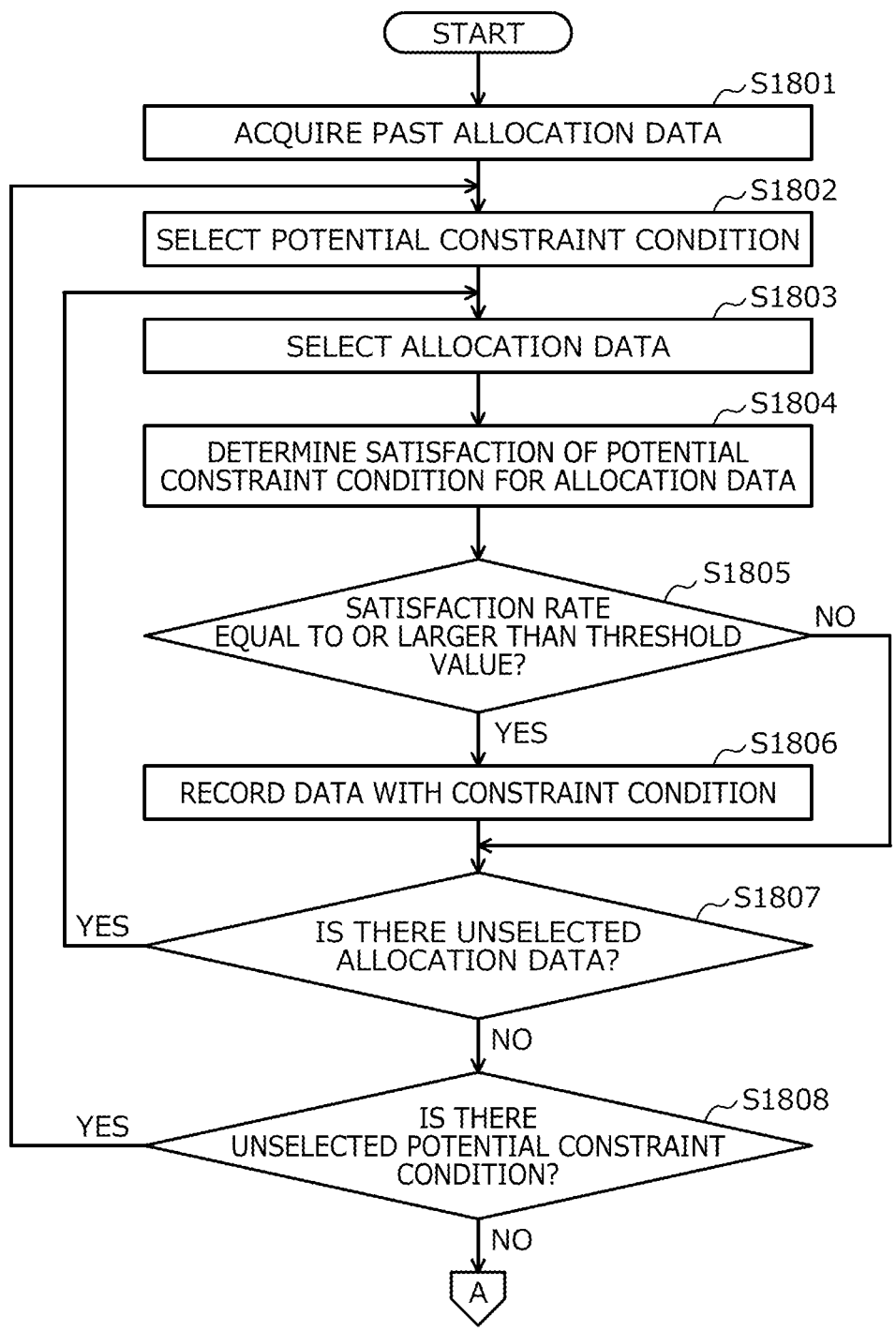
FIG. 18 is a flowchart (part 1) illustrating an example of an optimization processing procedure of the allocation support server 201 according to the second embodiment.
Figure 19:
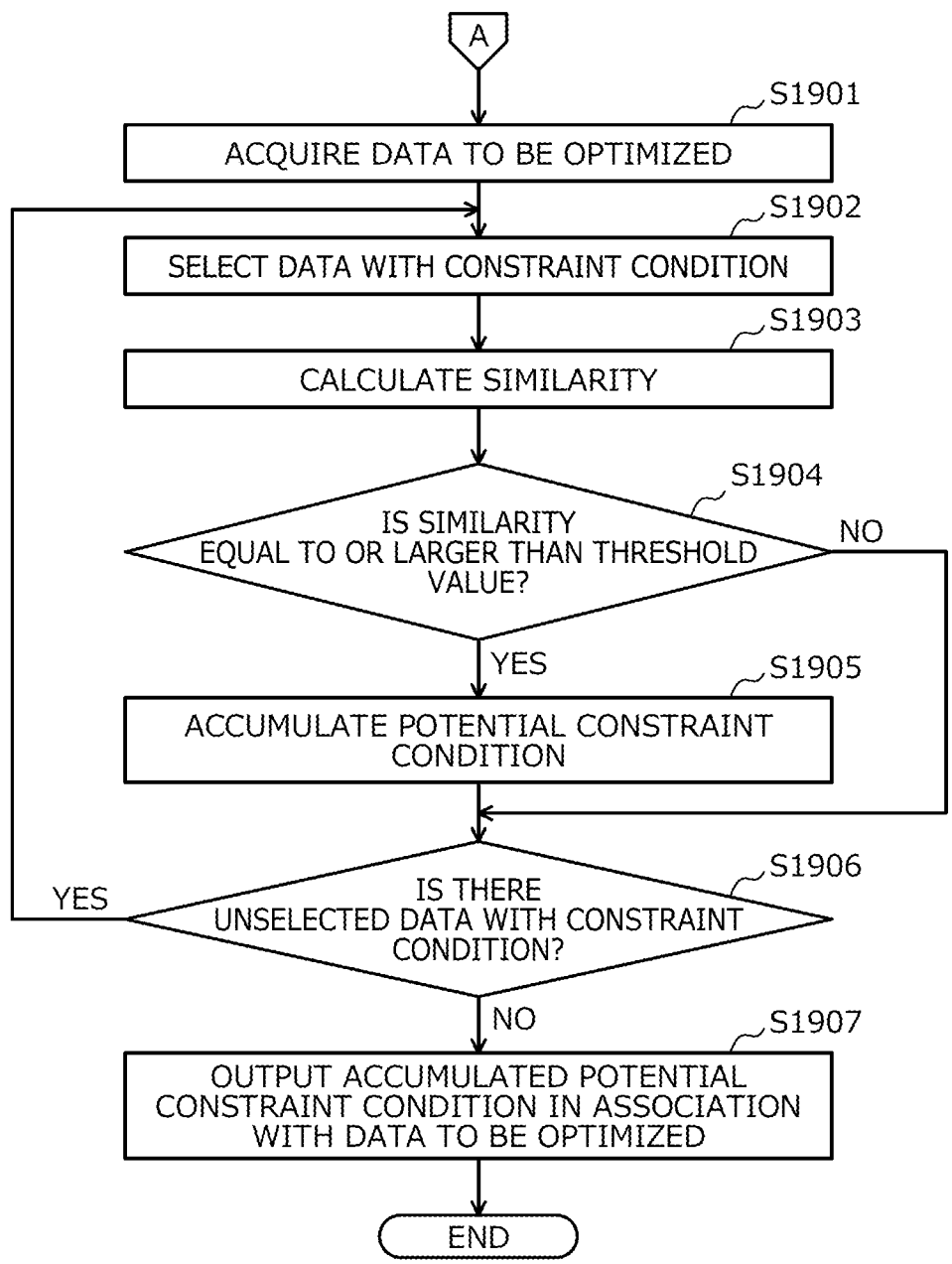
FIG. 19 is a flowchart (part 2) illustrating an example of the optimization processing procedure of the allocation support server 201 according to the second embodiment.

FIGS. 18 and 19 are flowcharts illustrating an example of the optimization processing procedure of the allocation support server 201 according to the second embodiment. In the flowchart of FIG. 18, first, the allocation support server 201 acquires the past allocation data (step S1801). Next, the allocation support server 201 refers to a constraint condition DB 220 and selects an unselected potential constraint condition that has not been selected from among the generated potential constraint conditions (step S1802).

Next, the allocation support server 201 selects unselected allocation data that has not been selected from the acquired past allocation data (step S1803). Then, the allocation support server 201 calculates the satisfaction rate by determining satisfaction of the selected potential constraint condition for the selected allocation data (step S1804).

Next, the allocation support server 201 determines whether the calculated satisfaction rate is equal to or larger than the threshold value β (step S1805). Here, in the case where the satisfaction rate is less than the threshold value β (step S1805: No), the allocation support server 201 moves to step S1807.

On the other hand, in the case where the satisfaction rate is equal to or larger than the threshold value β (step S1805: Yes), the allocation support server 201 records the data with constraint conditions representing the selected allocation data, the selected potential constraint condition, and the calculated satisfaction rate in association with each other in the DB with constraint conditions 1600 (step S1806). Then, the allocation support server 201 determines whether there is unselected allocation data that has not been selected among the acquired past allocation data (step S1807).

Here, in a case where unselected allocation data remains (step S1807: Yes), the allocation support server 201 returns to step S1803. On the other hand, in the case where no unselected allocation data (step S1807: No), the allocation support server 201 determines whether there is an unselected potential constraint condition that has not been selected among the generated potential constraint conditions (step S1808).

Here, in the case where an unselected potential constraint condition remains (step S1808: Yes), the allocation support server 201 returns to step S1802. On the other hand, in the case where no unselected potential constraint condition remains (step S1808: No), the allocation support server 201 proceeds to step S1901 shown in FIG. 19.

In the flowchart of FIG. 19, first, the allocation support server 201 acquires the data to be optimized (step S1901). Next, the allocation support server 201 selects unselected data with constraint condition that has not been selected from the DB with constraint conditions 1600 (step S1902).

Then, the allocation support server 201 calculates the similarity between the data to be optimized and the past allocation data with reference to the selected data with constraint condition (step S1903). Next, the allocation support server 201 determines whether the calculated similarity is equal to or larger than the threshold value γ (step S1904).

Here, in the case where the similarity is less than the threshold value γ (step S1904: No), the allocation support server 201 moves to step S1906. On the other hand, in the case where the similarity is equal to or larger than or equal to the threshold value γ (step S1904: Yes), the allocation support server 201 accumulates the selected potential constraint condition (step S1905).

Then, the allocation support server 201 determines whether there is unselected data with constraint condition that has not been selected from the DB with constraint conditions 1600 (step S1906). Here, in the case where an unselected data with constraint condition remains (step S1906: Yes), the allocation support server 201 returns to step S1902.

On the other hand, in the case where no unselected data with constraint condition remains (step S1906: No), the allocation support server 201 outputs the accumulated potential constraint condition in association with the data to be optimized (step S1907) and terminates a series of processing according to the flowchart.

Thereby, the potential constraint condition to be used to optimize the data to be optimized can be determined. Note that, in step S1907, the allocation support server 201 may also execute processing of optimizing the data to be optimized using the accumulated potential constraint conditions.

(Screen Example of Determination Result Screen 2000)

Here, a determination result screen 2000 displayed on the client device 202 will be described with reference to FIG. 20.

FIG. 20 is an explanatory diagram illustrating a screen example of the determination result screen. In FIG. 20, the determination result screen 2000 is an example of an operation screen displaying the result of determining the satisfaction of the potential constraint condition for the data to be optimized. According to the determination result screen 2000, the person in charge of allocation knows that Agent1's shift (09:00-17:00) on Apr. 3, 2020 violates the constraint.

In this case, the person in charge of allocation may also optimize the data to be optimized by, for example, giving a potential constraint condition as a condition of an existing optimization algorithm.

As described above, according to the allocation support server 201 according to the second embodiment, the satisfaction rate of the past allocation data for the generated potential constraint condition is calculated, the similarity between the data to be optimized and the past allocation data is calculated, and whether to apply the potential constraint condition to the data to be optimized can be determined on the basis of the calculated satisfaction rate and similarity.

Thereby, the potential constraint condition to be applied to the data to be optimized can be determined from the similarity to the past allocation data. For example, a potential constraint condition having a high satisfaction rate when applied to the past allocation data similar to the data to be optimized can be determined as a condition to be used to optimize the data to be optimized.

Third Embodiment

Next, an allocation support server 201 according to a third embodiment will be described. In the third embodiment, a coping method when conflict set data is not sufficiently extracted due to the small amount of past allocation data will be described. A part same as the part described in the first and second embodiments is denoted with the same reference numeral, and illustration and description thereof are omitted.

(Functional Configuration Example of Allocation Support Server 201)

First, a functional configuration example of the allocation support server 201 according to the third embodiment will be described. Note that the functional configuration example of the allocation support server 201 according to the third embodiment is similar to the functional configuration example of the allocation support server 201 according to the first embodiment, and thus illustration is omitted. Here, functions different from the allocation support server 201 according to the first embodiment will be described.

An acquisition unit 601 acquires first allocation data and second allocation data obtained by modifying the first allocation data. Here, the first allocation data is allocation data optimized on the basis of a known constraint condition, and shows an allocation result automatically allocated by a machine (computer). The known constraint condition is, for example, an explicit constraint condition.

The second allocation data is, for example, allocation data obtained by manually modifying the first allocation data by a person in charge of allocation or the like. Specifically, for example, the acquisition unit 601 acquires the first allocation data and the second allocation data from a client device 202. Furthermore, the acquisition unit 601 may also acquire the first allocation data and the second allocation data input by a user operation using an input device (not illustrated).

In the following description, the first allocation data may be referred to as "machine allocation data" and the second allocation data may be referred to as "correction allocation data".

The extraction unit 602 compares the machine allocation data with the correction allocation data, and identifies a difference between the machine allocation data and the correction allocation data. Furthermore, the extraction unit 602 performs satisfaction determination of the explicit constraint condition for the machine allocation data. Furthermore, the extraction unit 602 performs satisfaction determination of the explicit constraint condition for the correction allocation data.

Then, the extraction unit 602 extracts a portion where the satisfaction determination result of the explicit constraint condition has changed, of a difference between the machine allocation data and the correction allocation data, as data violating the explicit constraint condition, on the basis of the satisfaction determination result of the explicit constraint condition for the machine allocation data and the satisfaction determination result of the explicit constraint condition for the correction allocation data.

Specifically, for example, the extraction unit 602 extracts a portion satisfied in the machine allocation data but not satisfied in the correction allocation data, of the difference between the machine allocation data and the correction allocation data, as the data violating the explicit constraint condition. That is, since the satisfaction of the condition has changed due to the modification, the extraction unit 602 extracts the portion as a data section related to (reciprocity of) the condition.

Furthermore, the extraction unit 602 extracts a portion not satisfied in the machine allocation data but satisfied in the correction allocation data, of the difference between the machine allocation data and the correction allocation data, as the data violating the explicit constraint condition. That is, since the satisfaction of the condition has changed due to the modification, the extraction unit 602 extracts the portion as a data section related to (reciprocity of) the condition.

In the case where the number of acquired past allocation data is less than a predetermined number, the extraction unit 602 may also execute the processing of extracting the data violating the explicit constraint condition from the difference between the machine allocation data and the correction allocation data. The predetermined number can be arbitrarily set. That is, in the case where sufficient conflict set data is not able to be obtained only from the past allocation data, the conflict set data may also be extracted using the machine allocation data and the correction allocation data.

(Operation Example of Allocation Support Server 201)

Next, an operation example of the allocation support server 201 according to the third embodiment will be described with reference to FIGS. 21A and 21B.

Figure 21B:
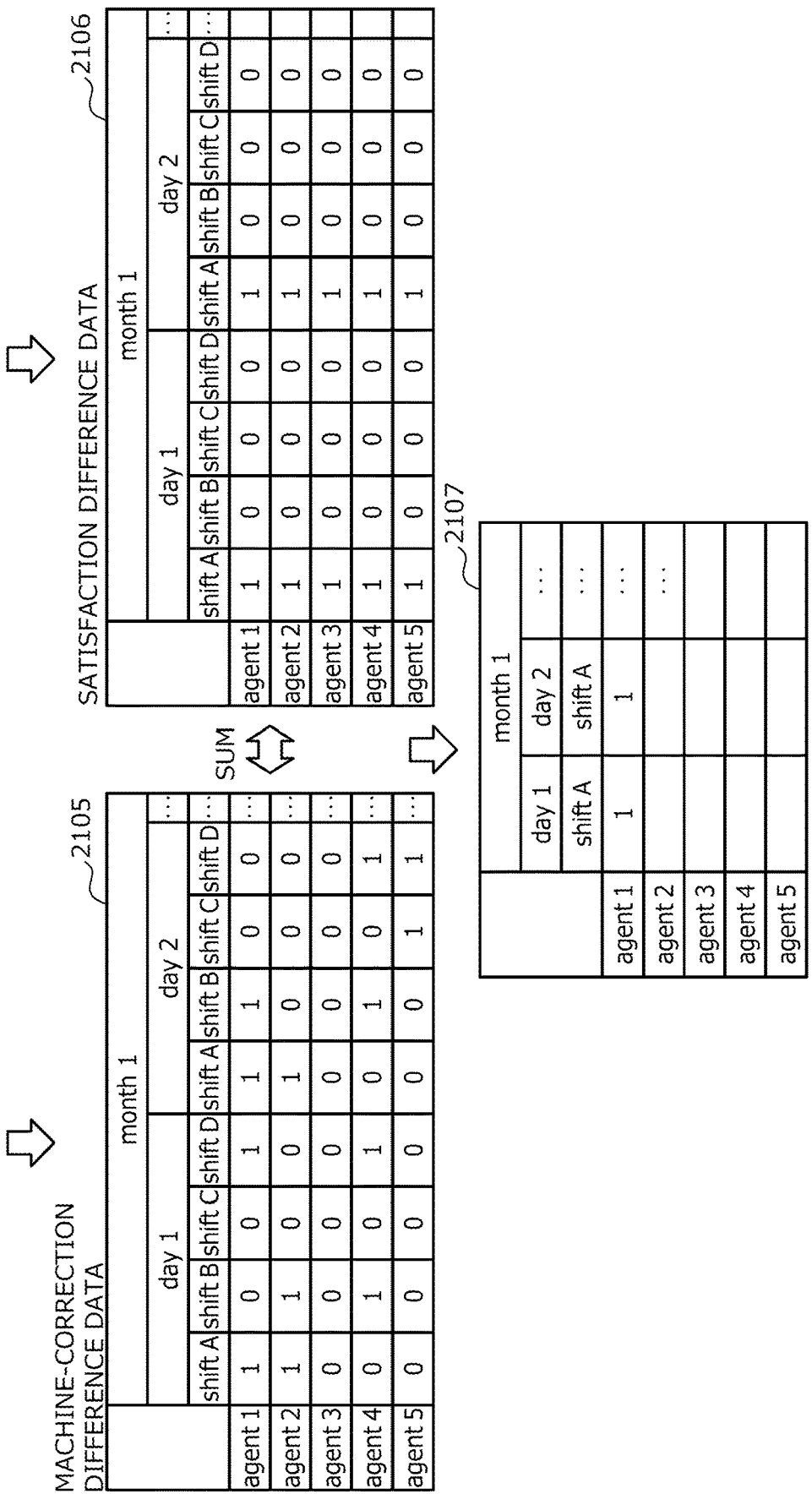
FIG. 21B is an explanatory diagram (part 2) illustrating an operation example of the allocation support server 201 according to the third embodiment.

FIGS. 21A and 21B are explanatory diagrams illustrating an operation example of the allocation support server 201 according to the third embodiment. FIG. 21A illustrates machine allocation data 2101 and correction allocation data 2102. Furthermore, the allocation support server 201 performs satisfaction determination of the explicit constraint condition for the machine allocation data 2101.

A satisfaction determination result 2103 illustrates a satisfaction determination result of the explicit constraint condition for the machine allocation data 2101. The allocation support server 201 performs satisfaction determination of the explicit constraint condition for the correction allocation data 2102. A satisfaction determination result 2104 illustrates a satisfaction determination result of the explicit constraint condition for the correction allocation data 2102.

In FIG. 21B, the allocation support server 201 compares the machine allocation data 2101 with the correction allocation data 2102, and creates difference data 2105 between the machine allocation data 2101 and the correction allocation data 2102. Furthermore, the allocation support server 201 compares the satisfaction determination result 2103 and the satisfaction determination result 2104, and creates difference data 2106 between the satisfaction determination result 2103 and the satisfaction determination result 2104.

Then, the allocation support server 201 extracts a portion where the satisfaction determination result has changed in the difference data 2105 between the machine allocation data 2101 and the correction allocation data 2102, as data violating the explicit constraint condition, with reference to the difference data 2106. As a result, conflict set data 2107 is extracted.

Note that, in the case where a difference between the satisfaction rate of the explicit constraint condition in the machine allocation data 2101 and the satisfaction rate of the explicit constraint condition in the correction allocation data 2102 is equal to or larger than a fixed value, the allocation support server 201 may also extract the portion where the satisfaction determination result has changed as the data violating the explicit constraint condition. Thereby, the conflict set data can be efficiently collected.

(Information Processing Procedure of Allocation Support Server 201)

Next, an information processing procedure of the allocation support server 201 according to the third embodiment will be described with reference to FIGS. 22 and 23.

Figure 22:
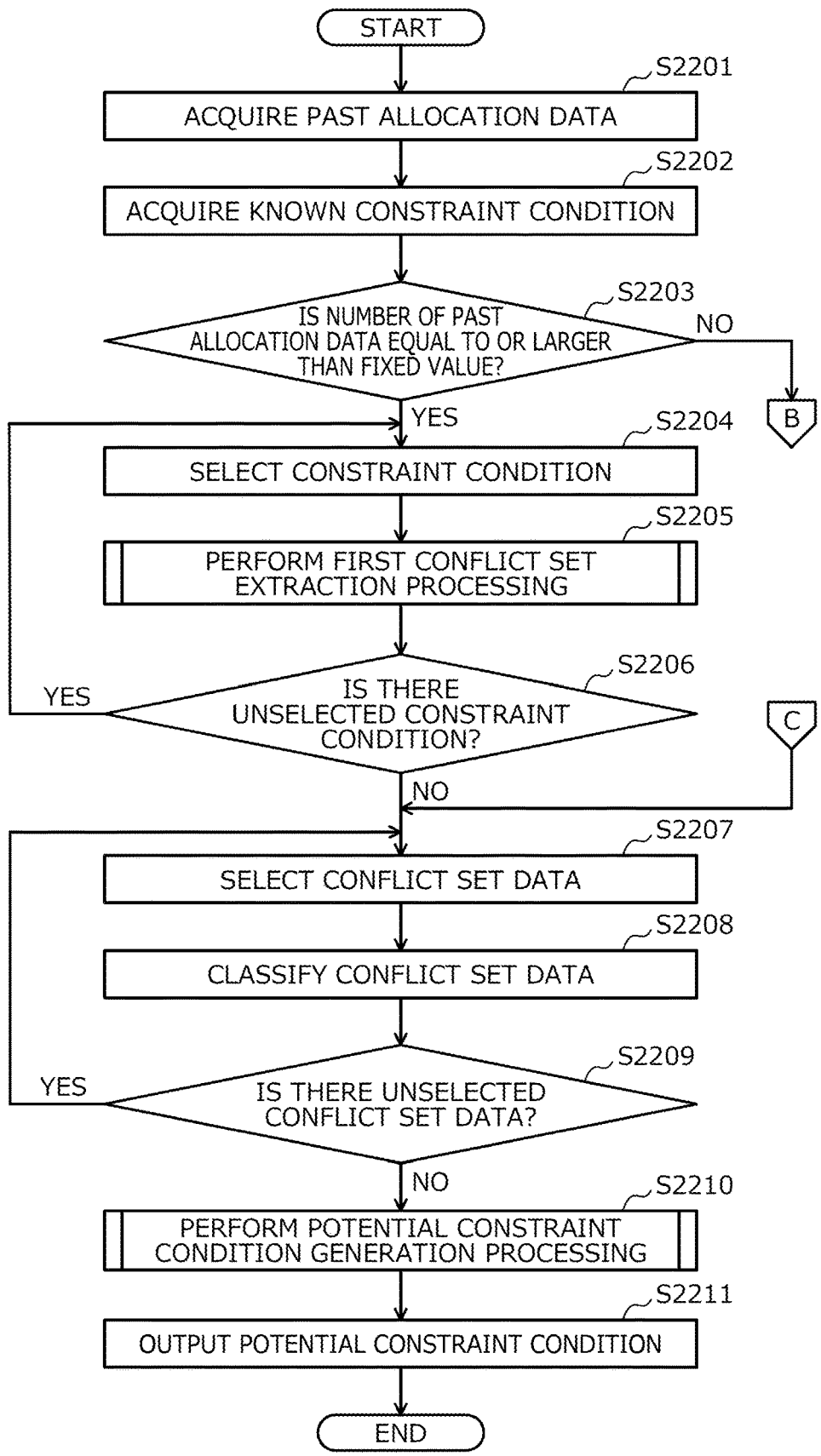
FIG. 22 is a flowchart (part 1) illustrating an example of an information processing procedure of the allocation support server 201 according to the third embodiment.
Figure 23:
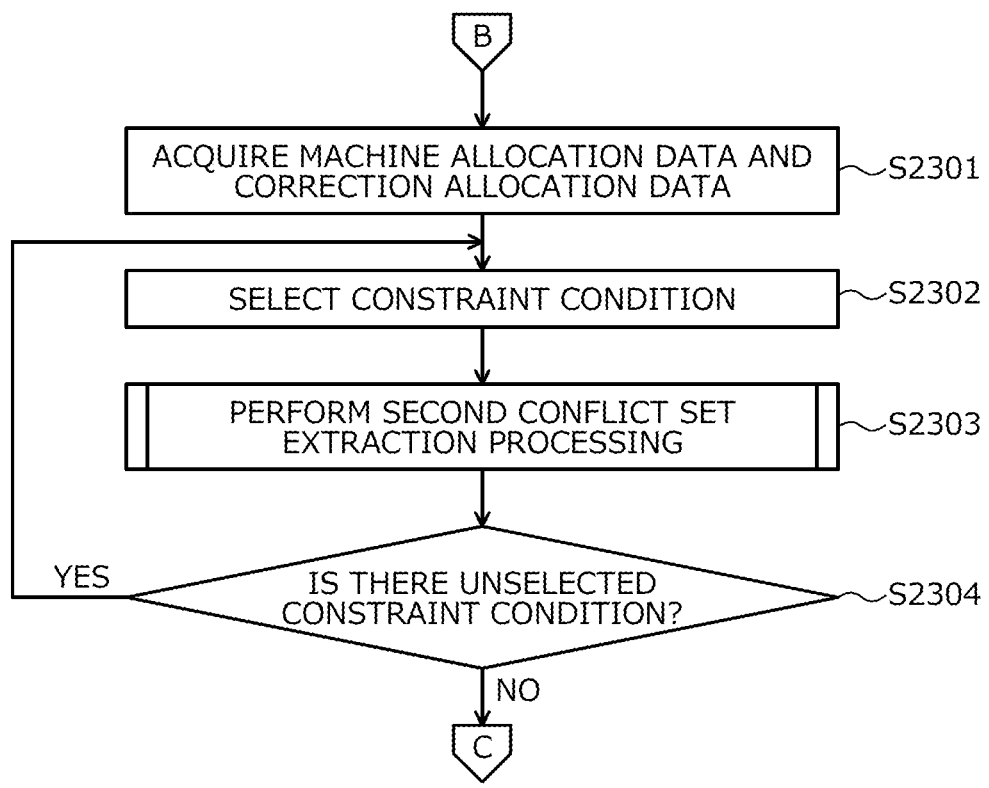
FIG. 23 is a flowchart (part 2) illustrating an example of the information processing procedure of the allocation support server 201 according to the third embodiment.

FIGS. 22 and 23 are flowcharts illustrating an example of the information processing procedure of the allocation support server 201 according to the third embodiment. In the flowchart of FIG. 22, first, the allocation support server 201 acquires the past allocation data (step S2201). Next, the allocation support server 201 acquires the known constraint condition from the constraint condition DB 220 (step S2202).

Then, the allocation support server 201 determines whether the number of acquired past allocation data is a fixed number or more (step S2203). Here, in the case where the number is the fixed number or more (step S2203: Yes), the allocation support server 201 selects an unselected constraint condition that has not been selected from the acquired known constraint conditions as the explicit constraint condition (step S2204).

Next, the allocation support server 201 executes first conflict set extraction processing of extracting data that violates the selected corresponding explicit constraint condition (step S2205). Note that, since the specific processing procedure of the first conflict set extraction processing is similar to the specific processing procedure of the conflict set extraction processing illustrated in FIG. 11, illustration and description thereof will be omitted.

Then, the allocation support server 201 determines whether there is an unselected constraint condition that has not been selected from the acquired known constraint conditions (step S2206). Here, in the case where an unselected constraint condition remains (step S2206: Yes), the allocation support server 201 returns to step S2204.

On the other hand, in the case where no unselected constraint condition remains (step S2206: No), the allocation support server 201 selects unselected conflict set data that has not been selected from the extracted conflict set data (step S2207). Next, the allocation support server 201 classifies the selected conflict set data into a plurality of groups according to a predetermined criterion (step S2208).

Then, the allocation support server 201 determines whether there is unselected conflict set data that has not been selected from the extracted conflict set data (step S2209). Here, in the case where unselected conflict set data remains (step S2209: Yes), the allocation support server 201 returns to step S2207.

On the other hand, in the case where no unselected conflict set data remains (step S2209: No), the allocation support server 201 executes potential constraint condition generation processing on the basis of the conflict set data of each of the plurality of classified groups (step S2210). Note that, since the specific processing procedure of the potential constraint condition generation processing is similar to the specific processing procedure of the potential constraint condition generation processing illustrated in FIG. 12, illustration and description thereof will be omitted.

Then, the allocation support server 201 outputs the generated potential constraint condition (step S2211) and terminates a series of processing according to the present flowchart. Furthermore, in the case where the number is less than the fixed number in step S2203 (step S2203: No), the allocation support server 201 proceeds to step S2301 illustrated in FIG. 23.

In the flowchart of FIG. 23, first, the allocation support server 201 acquires one or more pairs of the machine allocation data and the correction allocation data (step S2301). Then, the allocation support server 201 selects an unselected constraint condition that has not been selected from the acquired known constraint conditions as the explicit constraint condition (step S2302).

Next, the allocation support server 201 executes second conflict set extraction processing of extracting data that violates the selected corresponding explicit constraint condition (step S2303). A specific processing procedure of the second conflict set extraction processing will be described below with reference to FIG. 24. Then, the allocation support server 201 determines whether there is an unselected constraint condition that has not been selected from the acquired known constraint conditions (step S2304).

Here, in the case where an unselected constraint condition remains (step S2304: Yes), the allocation support server 201 returns to step S2302. On the other hand, in the case where no unselected constraint condition remains (step S2304: No), the allocation support server 201 returns to step S2207 shown in FIG. 22.

Thereby, the potential constraint condition set on the basis of preferences of a specific individual or team can be automatically extracted. Furthermore, when the number of acquired past allocation data is less than the fixed number, the conflict set data can be obtained using a feedback to the machine allocation (result) of the person in charge of allocation.

Next, a specific processing procedure of the second conflict set extraction processing of step S2303 illustrated in FIG. 23 will be described with reference to FIG. 24.

Figure 24:
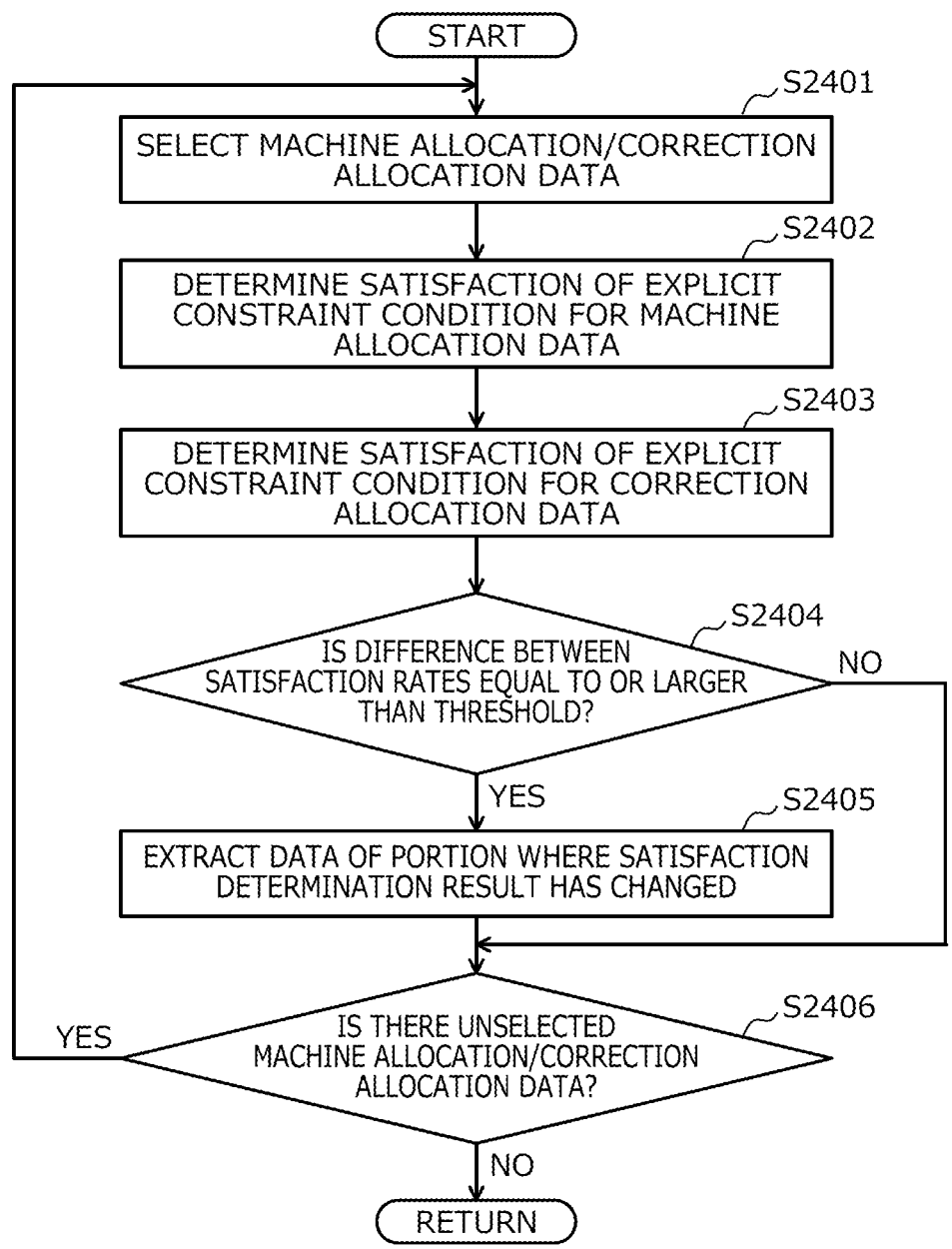
FIG. 24 is a flowchart illustrating an example of a specific processing procedure of second conflict set extraction processing.

FIG. 24 is a flowchart illustrating an example of a specific processing procedure of the second conflict set extraction processing. In the flowchart of FIG. 24, first, the allocation support server 201 selects an unselected pair (machine allocation/correction allocation data) that has not been selected from acquired pairs of the machine allocation data and the correction allocation data (step S2401).

Then, the allocation support server 201 determines satisfaction of the selected explicit constraint condition for the machine allocation data of the selected machine allocation/correction allocation data (step S2402). Next, the allocation support server 201 determines satisfaction of the selected explicit constraint condition for the correction allocation data of the selected machine allocation/correction allocation data (step S2403).

Then, the allocation support server 201 determines whether the difference between the satisfaction rate of the explicit constraint condition in the machine allocation data and the satisfaction rate of the explicit constraint condition in the correction allocation data is a fixed value or more (step S2404). Here, in the case where the difference is less than the fixed value (step S2404: No), the allocation support server 201 moves to step S2406.

On the other hand, in the case where the difference is the fixed value or more (step S2404: Yes), a portion where the satisfaction determination result has changed, of the difference between the machine allocation data and the correction allocation data, is extracted as the data violating the explicit constraint condition (step S2405). Then, the allocation support server 201 determines whether there is an unselected pair (machine allocation/correction allocation data) that has not been selected from acquired pairs of the machine allocation data and the correction allocation data (step S2406).

Here, in the case where an unselected machine allocation/correction allocation data remains (step S2406: Yes), the allocation support server 201 returns to step S2401. On the other hand, in the case where no unselected machine allocation/correction allocation data remains (step S2406: No), the allocation support server 201 returns to the step in which the second conflict set extraction processing has been called.

Thereby, the portion in which the satisfaction rate of the known constraint condition has changed, of the difference between the allocation data (machine allocation data) optimized on the basis of the known constraint condition and the data (correction allocation data) modified by the person in charge of allocation, can be extracted as the conflict set data.

As described above, according to the allocation support server 201 according to the third embodiment, the machine allocation data optimized on the basis of the known condition and the correction allocation data obtained by modifying the machine allocation data can be acquired. Then, according to the allocation support server 201, the portion where the satisfaction determination result of the explicit constraint condition has changed, of the difference between the machine allocation data and the correction allocation data, can be extracted as the data violating the explicit constraint condition, on the basis of the satisfaction determination result of the explicit constraint condition for the machine allocation data and the satisfaction determination result of the explicit constraint condition for the correction allocation data.

Thereby, the conflict set data violating the known constraint condition can be obtained using the feedback to the machine allocation (result) of the person in charge of allocation. For example, in the case where the person in charge of allocation modifies the machine allocation data, there is a possibility that the modification is made in consideration of various conditions implicitly known. Therefore, if the difference between the machine allocation data and the correction allocation data is simply regarded as conflict data, there is a possibility that data related to various conditions will be mixed. On the other hand, according to the allocation support server 201, the portion in which the satisfaction rate of a certain known constraint condition changes, of the difference between the machine allocation data and the correction allocation data, can be extracted, so that the conflict data related to the specific potential constraint condition can be extracted.

Furthermore, according to the allocation support server 201, in the case where the number of acquired past allocation data is less than a predetermined number, the portion in which the satisfaction determination result of the explicit constraint condition has changed, of the difference between the machine allocation data and the correction allocation data, can be extracted as the data violating the explicit constraint condition.

Thereby, in the case where sufficient conflict set data is not able to be obtained only from the past allocation data, the conflict set data violating the known constraint condition can be extracted using the feedback to the machine allocation (result) of the person in charge of allocation.

Thereby, according to the allocation support server 201 (information processing device 101) according to the first to third embodiment, the constraint condition for optimizing the resource allocation can be automatically extracted without conducting a careful interview or the like in advance by the person in charge of allocation. Furthermore, according to the allocation support server 201 (information processing device 101), the resource allocation with high precision can be implemented by using the extracted constraint condition (potential constraint condition) as a condition of the optimization algorithm. Furthermore, according to the allocation support server 201 (information processing device 101), it becomes possible to objectively evaluate the past resource allocation using the extracted constraint condition (potential constraint condition), and a condition that the person in charge of allocation himself/herself is not aware of can be discovered and used for team management or the like.

Note that each of the first to third embodiments may be implemented in combination as long as no contradiction arises. For example, the allocation support server 201 according to the third embodiment may also have functions same as those of the allocation support server 201 according to the second embodiment.

Note that the information processing method described in the present embodiment may be implemented by executing a prepared program on a computer such as a personal computer or a workstation. The present information processing program is recorded on a computer-readable recording medium such as a hard disk, flexible disk, CD-ROM, DVD, or USB memory and is read from the recording medium to be executed by a computer. Additionally, the present information processing program may also be distributed via a network such as the Internet.

Furthermore, the allocation support server 201 (information processing device 101) escribed in the present embodiments may also be implemented by a special-purpose integrated circuit (IC) such as a standard cell or a structured application specific integrated circuit (ASIC) or a programmable logic device (PLD) such as a field-programmable gate array (FPGA).

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
one or more memories; and
one or more processors coupled to the one or more memories and the one or more processors configured to:
acquire allocation data that indicates an allocation result of a plurality of resources for a plurality of allocation destinations,
extract data that violates a first condition from the acquired allocation data, the first condition regarding total working hours, time zone of working, and a number of times employees work during a predetermined period in a week, the first condition including at least one of work hours being evenly allocated to all of the employees and the work hours allocated to the employees being less than or equal to a certain amount of time,
classify the extracted data into a plurality of groups,
acquire an index value regarding an appearance frequency of an allocation pattern of a resource of the plurality of resources based on data of each of the plurality of classified groups, and
generate a second condition for the allocation pattern based on the index value.

2. The information processing device according to claim 1, wherein the one or more processors are further configured to:
specify an allocation pattern of a resource of which the index value is equal to or larger than a threshold value, and
generate the second condition that conflicts the first condition for the specified allocation pattern based on the allocation data.

3. The information processing device according to claim 1, wherein the one or more processors are further configured to:
acquire a rate of data of past allocation data that satisfies the generated second condition,
acquire a similarity between data to be optimized and the past allocation data, and
determine whether to apply the second condition to the data to be optimized based on the rate and the similarity.

4. The information processing device according to claim 1, wherein the one or more processors are further configured to:
  acquire first allocation data optimized based on a known condition and second allocation data obtained by modifying the first allocation data; and
  extracting, based on a satisfaction determination result of the first condition with respect to the first allocation data and a satisfaction determination result of the first condition with respect to the second allocation data, a portion where the satisfaction determination result of the first condition has changed from a difference between the first allocation data and the second allocation data as the data that violates the first condition.

5. The information processing device according to claim 4, wherein the one or more processors are further configured to
  extract the portion when the number of the acquired allocation data is less than a certain number.

6. The information processing device according to claim 1, wherein
  the first condition relates to fairness, which is uniformly applied to the plurality of resources.

7. The information processing device according to claim 1, wherein the one or more processors are further configured to
  classify the extracted data into a plurality of groups for each certain period.

8. The information processing device according to claim 1, wherein the one or more processors are further configured to:
  when new allocation data is acquired after the second condition is generated, determine whether resources to be allocated are similar between the new allocation data and the allocation data, and
  when the resources to be allocated are similar, extract the data that violates the first condition from the new allocation data by using the first condition.

9. The information processing device according to claim 1, wherein the one or more processors are further configured to:
  generate a conflict candidate condition common in a plurality of conditions, and
  extract the data that violates the first condition from the allocation data obtained based on the generated conflict candidate condition as the first condition.

10. An information processing method for a computer to execute a process comprising:
  acquiring allocation data that indicates an allocation result of a plurality of resources for a plurality of allocation destinations;
  extracting data that violates a first condition from the acquired allocation data, the first condition regarding total working hours, time zone of working, and a number of times employees work during a predetermined period in a week, the first condition including at least one of work hours being evenly allocated to all of the employees and the work hours allocated to the employees being less than or equal to a certain amount of time;
  classifying the extracted data into a plurality of groups;
  acquiring an index value regarding an appearance frequency of an allocation pattern of a resource of the plurality of resources based on data of each of the plurality of classified groups; and
  generating a second condition for the allocation pattern based on the index value.

11. A non-transitory computer-readable storage medium storing an information processing program that causes at least one computer to execute a process, the process comprising:
  acquiring allocation data that indicates an allocation result of a plurality of resources for a plurality of allocation destinations;
  extracting data that violates a first condition from the acquired allocation data, the first condition regarding total working hours, time zone of working, and a number of times employees work during a predetermined period in a week, the first condition including at least one of work hours being evenly allocated to all of the employees and the work hours allocated to the employees being less than or equal to a certain amount of time;
  classifying the extracted data into a plurality of groups;
  acquiring an index value regarding an appearance frequency of an allocation pattern of a resource of the plurality of resources based on data of each of the plurality of classified groups; and
  generating a second condition for the allocation pattern based on the index value.

* * * * *